United States Patent
Damon et al.

(10) Patent No.: US 11,065,086 B2
(45) Date of Patent: Jul. 20, 2021

(54) ARCHWIRE FOR USE WITH A PASSIVE LIGATING ORTHODONTIC BRACKET SYSTEM

(71) Applicant: Premier Orthodontic Designs, LLLP, Carson City, NV (US)

(72) Inventors: Paul L. Damon, Spokane, WA (US); Dwight H. Damon, Spokane, WA (US)

(73) Assignee: Premier Orthodontic Designs LLLP, Carson City, NV (US)

( * ) Notice: Subject to any disclaimer, the term of this patent is extended or adjusted under 35 U.S.C. 154(b) by 0 days.

(21) Appl. No.: 14/976,074

(22) Filed: Dec. 21, 2015

(65) Prior Publication Data
US 2017/0172707 A1    Jun. 22, 2017

(51) Int. Cl.
| | |
|---|---|
| *A61C 7/20* | (2006.01) |
| *A61C 7/12* | (2006.01) |
| *A61C 7/16* | (2006.01) |
| *A61C 7/14* | (2006.01) |
| *A61C 7/28* | (2006.01) |

(52) U.S. Cl.
CPC .................. *A61C 7/20* (2013.01); *A61C 7/12* (2013.01); *A61C 7/16* (2013.01); *A61C 7/287* (2013.01); *A61C 7/14* (2013.01)

(58) Field of Classification Search
CPC .... A61C 7/20; A61C 7/28; A61C 7/12; A61C 7/14; A61C 7/16; A61C 7/141; A61C 7/146; A61C 7/285; A61C 7/287
USPC ....................................................... 433/8–24
See application file for complete search history.

(56) References Cited

U.S. PATENT DOCUMENTS

| | | | |
|---|---|---|---|
| 5,030,089 | A | 7/1991 | Kawaguchi |
| 5,464,347 | A | 11/1995 | Allesee |
| 5,908,293 | A | 6/1999 | Voudouris |
| 6,168,428 | B1 | 1/2001 | Voudouris |
| 7,686,613 | B2 | 3/2010 | Pospisil et al. |
| 7,878,802 | B2 | 2/2011 | Hagelganz et al. |
| 8,714,972 | B2 | 5/2014 | Eichenberg |

(Continued)

FOREIGN PATENT DOCUMENTS

| | | |
|---|---|---|
| AU | 5016399 A | 3/2000 |
| JP | 2011025070 A | 2/2011 |

(Continued)

OTHER PUBLICATIONS

International Search Report and the Written Opinion of the International Searching Authority, dated Oct. 14, 2016, PCT/US2016/045508.

(Continued)

*Primary Examiner* — Heidi M Eide
*Assistant Examiner* — Drew S Folgmann
(74) *Attorney, Agent, or Firm* — Wood Herron & Evans LLP

(57) ABSTRACT

An archwire for use with a passive self-ligation orthodontic bracket is described and which includes a resilient main body which is received in the archwire slot, and which further has a predetermined width dimension, and a variable thickness dimension, and wherein the variable thickness dimension of the archwire can be varied so as to facilitate an adjustable application of a force to the passive self-ligation orthodontic bracket so as to achieve a clinician selectable and controllable second and third order movement of a patient's tooth.

26 Claims, 11 Drawing Sheets

(56) References Cited

U.S. PATENT DOCUMENTS

| | | | |
|---|---|---|---|
| 2004/0214128 A1 | | 10/2004 | Sachdeva et al. |
| 2006/0154196 A1* | | 7/2006 | Oda .................. A61C 7/287 433/13 |
| 2009/0042160 A1 | | 2/2009 | Ofir |
| 2010/0178629 A1 | | 7/2010 | Oda et al. |
| 2010/0304321 A1* | | 12/2010 | Patel .................. A61C 7/20 433/9 |
| 2011/0270583 A1* | | 11/2011 | Getto .................. A61C 7/20 703/1 |
| 2012/0107760 A1 | | 5/2012 | Eichenberg |
| 2014/0272751 A1* | | 9/2014 | Cosse .................. A61C 7/02 433/9 |
| 2015/0050612 A1 | | 2/2015 | Damon et al. |
| 2015/0230887 A1 | | 8/2015 | Damon et al. |

FOREIGN PATENT DOCUMENTS

| | | | |
|---|---|---|---|
| JP | 2012065897 A | | 4/2012 |
| RU | 114840 U1 | | 4/2012 |
| WO | 2009078031 A1 | | 6/2009 |
| WO | WO 2009078031 A1 * | 6/2009 | .............. A61C 7/20 |
| WO | 2015026400 A2 | | 2/2015 |

OTHER PUBLICATIONS

Notification of Transmittal of the International Search Report and the Written Opinion of the International Searching Authority, or the Declaration, PCT/US17/44310, dated Aug. 16, 2017.

Notification of Transmittal of International Preliminary Report on Patentability, PCT/US16/45508, dated Jan. 16, 2018.

International Preliminary Report on Patentability, PCT/US16/45508.

Canadian Patent Office, Office Action in corresponding Canadian Application No. 2,994,283 dated Jun. 6, 2018.

International Bureau of WIPO, International Preliminary Report on Patentability in corresponding International Patent Application No. PCT/US2017/044310, dated Mar. 26, 2019.

New Zealand Intellectual Property Office, Office Action in corresponding New Zealand Patent Application No. 739415 dated Nov. 2, 2018.

Australian Patent Office, Office Action in corresponding Australian Application No. 2016375591 dated Dec. 10, 2018.

Korean Patent Office, Decision of Rejection issued in KR 102018-7003019 dated Jul. 30, 2020.

European Patent Office, Extended Search Report issued in EP 17853594.4 dated Aug. 9, 2020.

U.S. Patent and Trademark Office, Office Action in corresponding U.S. Appl. No. 15/271,894 dated Dec. 31, 2019.

Major et al., "Investigation into the Mechanical Characteristics of Select Self-Litigated Brackets at a Series of Clinically Relevant Maximum Torquing Angles: Loading and Unloading Curves and Bracket Deformation.", European Journal of Orthodontics, vol. 35, Issue 6, Dec. 2013, pp. 719-729.

Russian Patent Office, Decision to Grant issued in RU 2019111709 dated Jul. 23, 2020.

New Zealand Patent Office, Examination Report issued in NZ 739415 dated May 27, 2019.

Australian Patent Office, Examination Report issued in AU 2016375591 dated Feb. 16, 2018.

Japanese Patent Office, Office Action issued in JP 2019-536812 dated Nov. 24, 2020.

European Patent Office, extended European Search Report in corresponding European Application No. 16879523.5 dated Jul. 23, 2019.

Korean Patent Office, Notice of Preliminary Rejection issued in KR 10-2018-7003019 dated Mar. 27, 2018.

Korean Patent Office, Notice of Final Rejection issued in KR 10-2018-7003019 dated Aug. 30, 2018. Aug. 31, 2018.

\* cited by examiner

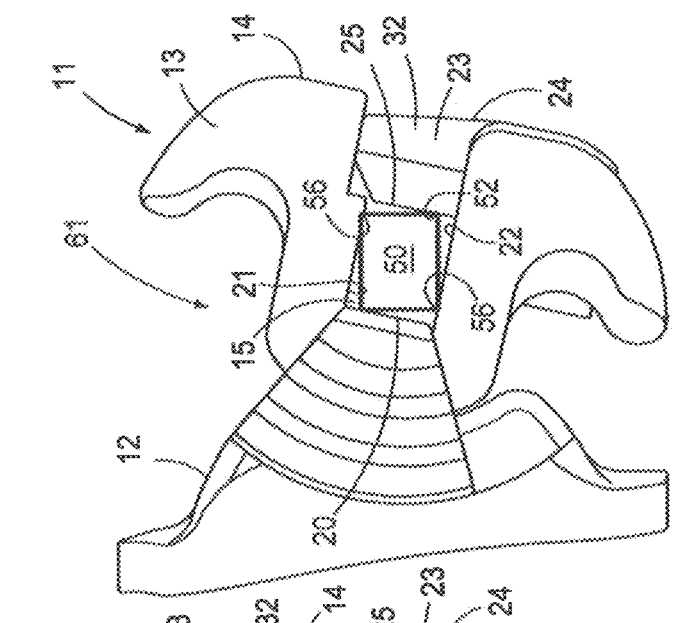
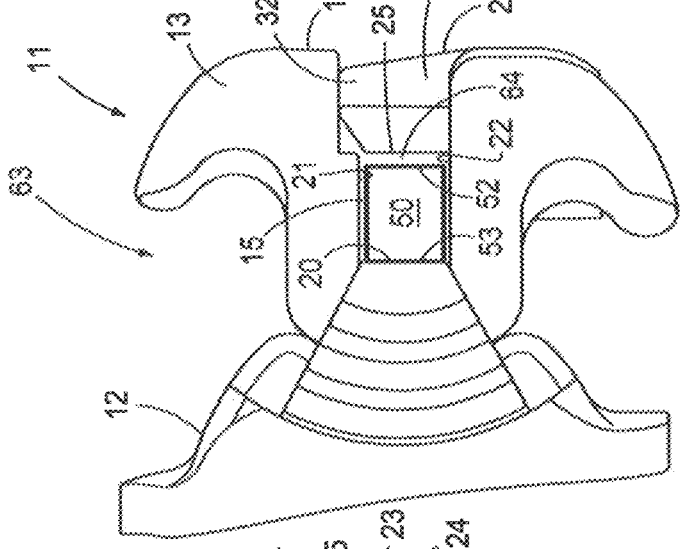
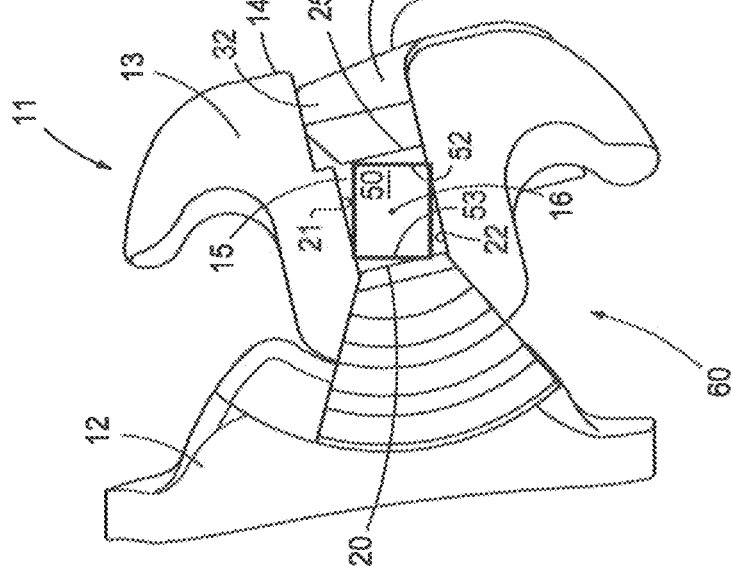
FIG. 4A PRIOR ART
FIG. 4B PRIOR ART
FIG. 4C PRIOR ART

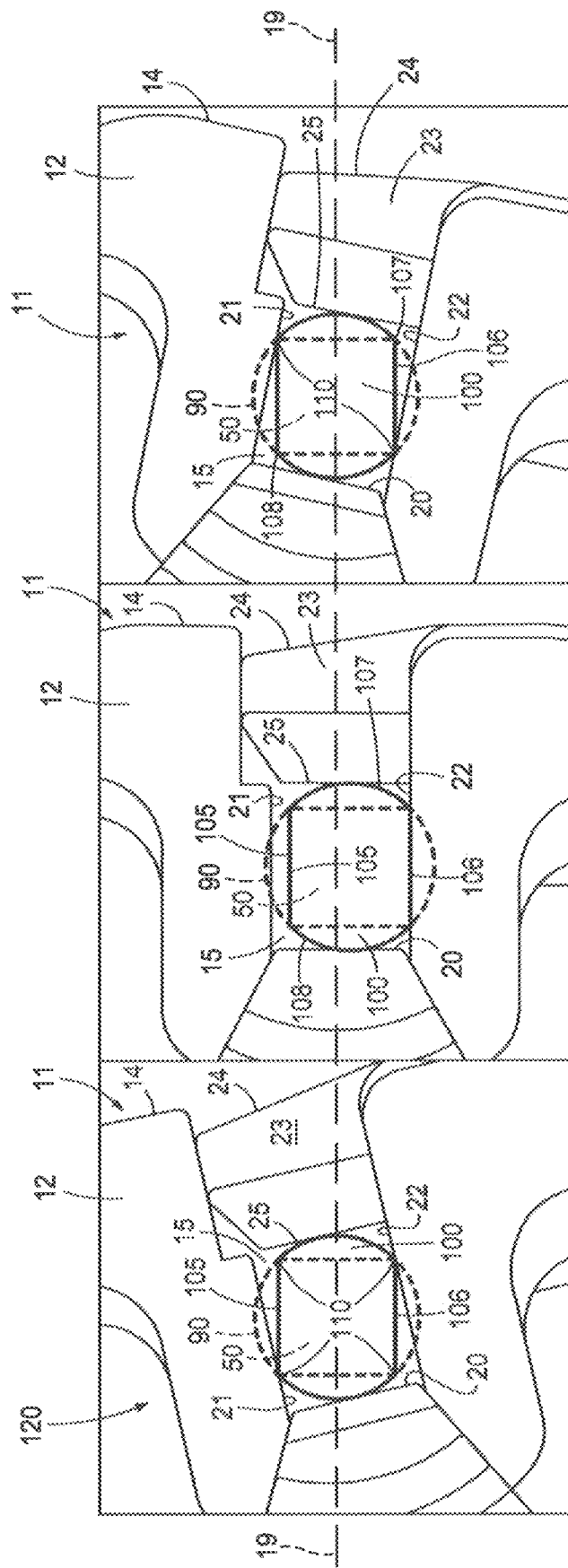

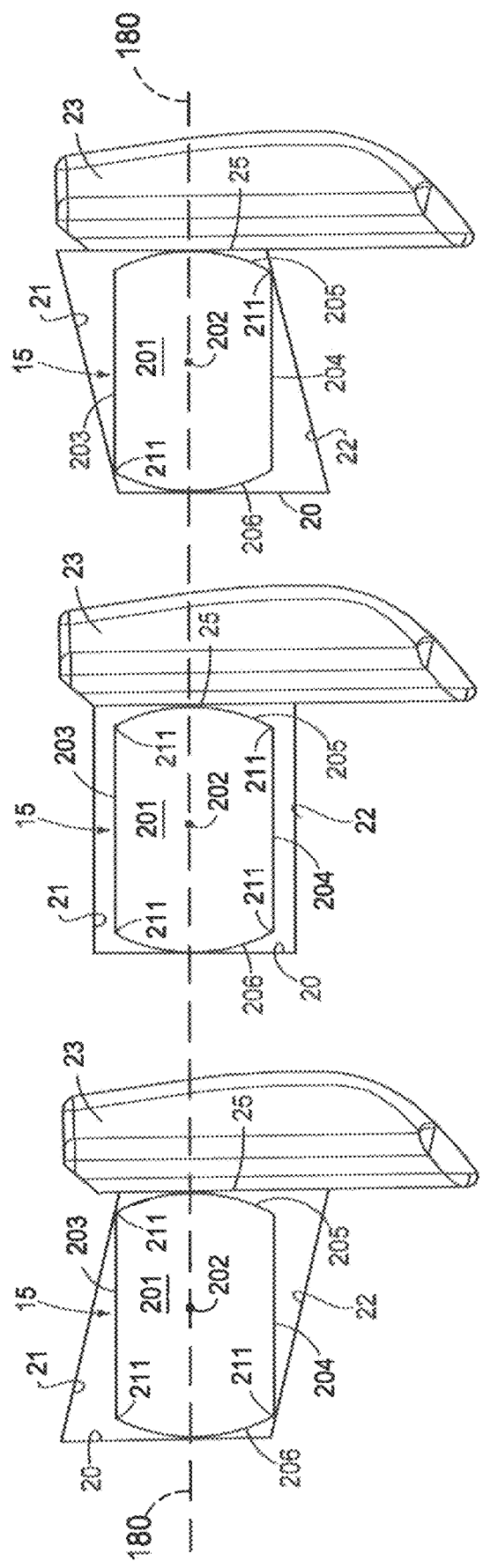

ARCHWIRE FOR USE WITH A PASSIVE LIGATING ORTHODONTIC BRACKET SYSTEM

TECHNICAL FIELD

The present invention relates to an orthodontic bracket apparatus, and more specifically to an archwire for use with the orthodontic bracket apparatus, and which has a given cross-sectional shape, and which further when received in an archwire slot of the orthodontic bracket apparatus can affect first, second and third order movements of a tooth of a patient undergoing orthodontic treatment in a manner not possible heretofore.

BACKGROUND OF THE INVENTION

In our earlier U.S. Pat. No. 9,198,740, the teachings of which are incorporated by reference herein, we disclosed a novel orthodontic bracket which was readily and easily utilized by a clinician, in a clinical setting, and which further provided a convenient means for adjusting the new orthodontic bracket in order to achieve a clinician selected first, second and third order movements of a patient's tooth in a manner not possible heretofore. In particular, the aforementioned new and novel orthodontic bracket included a bracket base which was affixed to the anterior facing surface of a patient's tooth, and which further had a bracket body which was partially rotatably moveable relative to the bracket base, and in a given axis of movement when the bracket base was suitably affixed to the tooth. The teachings of this patent disclose a bracket body which can be releasably detached from the bracket base, and an alternative bracket body releasably attached to the bracket base during a given orthodontic treatment plan in order to provide a clinician a wide range of treatment options in advancing an orthodontic treatment regimen and achieving desired first, second and third order movement of a patient's tooth in a manner not possible with prior art appliances that have been employed in the past.

Those skilled in the art will recognize that the teachings of the aforementioned U.S. patent concern an adjustable, passive self-ligating bracket which has significantly advanced the treatment options which are available to treat patients having various tooth anomalies in an expeditious, and much more comfortable manner, and further allows clinicians to achieve first, second and third order movement of a patient's tooth in a more precise, and exact way than was possible using the prior art appliances. While the aforementioned orthodontic bracket has provided clinicians with numerous treatment options for securing or treating various tooth anomalies, shortcomings attributable to the design of the prior art self-ligating orthodontic brackets have been known for some time and have detracted from the perceived usefulness of this type of orthodontic appliance under certain treatment conditions. For example, the aforementioned orthodontic bracket as disclosed in U.S. Pat. No. 9,198,740, and which issued on Dec. 1, 2015, has a moveable bracket body which can be readily adjusted by the clinician so as to provide or impart a low torqueing couple, a neutral torqueing couple or a high torqueing couple to the archwire which is received or otherwise enclosed within the associated archwire slot. In employing this or other styles of passive self-ligation orthodontic brackets, clinicians have continually noted some difficulty in closing the associated movable gate of the passive self-ligation orthodontic bracket when attempting to insert an archwire in the archwire slot, and when the orthodontic bracket has been oriented so as to impart either a low torqueing couple or a high torqueing couple to the archwire.

The aforementioned gate closing problem was chiefly associated with the enclosed archwire frictionally interfering with the closing or opening of the moveable gate by frictionally and forcibly engaging either the top or bottom, posterior facing surface of the moveable gate during the movement of the gate. As should be understood, and because of the close dimensional tolerances which are used in the fabrication of such passive self-ligation orthodontic brackets, this frictional resistance to the closure of the moveable gate has impeded the use of these adjustable, passive self-ligation brackets in certain treatment situations. To overcome or address this problem, clinicians have utilized or employed a smaller cross-sectionally dimensioned archwire within the archwire slot, and then they were able to close the moveable gate. However, the provision of this smaller archwire provided an incomplete solution to the aforementioned problem inasmuch as the smaller dimensioned archwire provided in the archwire slot negated or otherwise diminished the amount of first order movement control that the archwire could impart to the orthodontic bracket. In view of this diminished first order movement control, clinicians have often reverted to using a larger-sized archwire in the archwire slot in order to achieve the desired first and often second order movement control of the patient's tooth which had been sacrificed. Of course, the return to the larger cross-sectionally sized archwire, yet again, substantially prevented the closing of the moveable gate when the moveable bracket body was oriented so as to deliver either a low torqueing couple or a high torqueing couple to the enclosed archwire.

Therefore in the use of the aforementioned prior art adjustable passive self-ligation brackets a clinician was often faced with a dilemma which, on the one hand required giving up or surrendering a portion of the first and/or second order tooth control they might have over a patient's tooth in order to achieve third order movement which would be associated with either a high torqueing couple or low torqueing couple that is imparted to the enclosed archwire. Only rarely could a clinician have consistent first, second and third order control over the tooth of a patient.

An improved archwire which avoids the detriments associated with the prior art practices utilized heretofore is the subject matter of the present invention.

SUMMARY OF THE INVENTION

A first aspect of the present invention relates to an archwire for use with a passive self-ligation orthodontic bracket, and which has an archwire slot, and which further includes an elongated and resilient main body which is dimensioned to be received within the archwire slot of the passive self-ligation bracket, and wherein the resilient main body of the archwire has a circular-square or a circular-rectangular cross sectional shape having a predetermined circumferential width dimension, and a variable thickness dimension, and wherein the circumferential width dimension of the resilient main body maintains a consistent first order movement control of a tooth of a patient when the resilient main body of the archwire is cooperating with the passive self-ligation bracket, and wherein the variable thickness dimension of the archwire facilitates an adjustable application of a force to the passive self-ligation orthodontic bracket so as to achieve a clinician selectable, and controllable, second and third order movement of the tooth of the patient.

Still another aspect of the present invention relates to an archwire for use with a passive self-ligation orthodontic bracket, and which has an archwire slot, and which further includes an elongated and resilient main body which is dimensioned to be received within the archwire slot of the self-ligation orthodontic bracket with minimal bending, and which still further has a circular-square or circular-rectangular cross sectional shape, and wherein the resilient main body has a predetermined, and selectively variable thickness dimension which, when received in the archwire slot, and cooperating with the passive self-ligation orthodontic bracket, exerts a force which is based, at least in part, upon the thickness dimension of the resilient main body of the archwire, and which further effects first, second or third order movements of a tooth of a patient upon which the self-ligation orthodontic bracket is attached.

Still another aspect of the present invention relates to an archwire for use with a passive self-ligation orthodontic bracket and which has an archwire slot, and which further includes an elongated and resilient main body which is received within the archwire slot with a minimal amount of bending, and wherein the archwire slot has a width and height dimension, and the archwire has a predetermined width dimension, and a selectable thickness dimension, and wherein the archwire when received in the archwire slot cooperates with the passive self-ligation orthodontic bracket so as to simultaneously impart forces to the passive self-ligation orthodontic bracket, and which affects first, second and third order movement of a tooth of a patient, and upon which the passive self-ligation orthodontic bracket is attached, and wherein the resilient main body of the archwire has a circular-square or circular-rectangular cross sectional shape which, when cooperating with the archwire slot, consistently maintains first order movement control of the tooth of the patient while simultaneously permitting the passive self-ligation orthodontic bracket to exert a selectable amount of torqueing force to the tooth so as to achieve desired third order movement of the tooth based, at least in part, upon the thickness dimension of the archwire which is selected and positioned within the archwire slot.

Yet still another aspect of the present invention relates to an archwire for use with a self-ligation orthodontic bracket and which has an archwire slot, and which further includes an elongated and resilient main body which is dimensioned to be received within the archwire slot of the passive self-ligation bracket, and wherein the resilient main body of the archwire has a circular-square or a circular-rectangular cross sectional shape having a predetermined circumferential width dimension, and a variable thickness dimension, and wherein the resilient main body further has a longitudinal axis, and wherein the circular-square or circular-rectangular shaped main body is further defined by spaced, substantially parallel and planar superior and inferior facing surfaces which are individually oriented along parallel chords of the elongated, circular-square or circular-rectangular shaped main body, and wherein the thickness dimension of the resilient main body is measured between the superior and inferior facing surfaces, and wherein the superior and inferior facing surfaces are located at an equally spaced, radial distance from the longitudinal axis, and wherein the circumferential width dimension of the resilient main body of the archwire maintains a consistent first order movement control of a tooth of a patient when the archwire is cooperating with the passive self-ligation bracket, and wherein the variable thickness dimension of the archwire facilitates an adjustable application of a force to the passive self-ligation orthodontic bracket so as to achieve a clinician selectable, and controllable, second and third order movement of the tooth of the patient.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 4A is a greatly enlarged, side elevation view of a prior art adjustable, passive self-ligation bracket which encloses an archwire of traditional design, and wherein the adjustable, passive self-ligation bracket is oriented so as to impart a low torqueing couple to the enclosed archwire.

FIG. 4B is a greatly enlarged, side elevation view of a prior art adjustable passive self-ligation bracket which encloses an archwire of traditional design, and which further is oriented so as to impart a neutral torqueing couple to the enclosed archwire.

FIG. 4C is a greatly enlarged, side elevation view of a prior art adjustable passive self-ligation bracket which encloses an archwire of traditional design, and wherein the adjustable, passive self-ligation bracket is oriented so as to impart a high torqueing couple to the enclosed archwire.

FIG. 9A is a greatly enlarged, fragmentary, side elevation view of a prior art adjustable, passive self-ligation bracket utilizing the archwire of the present invention, and wherein the adjustable, passive self-ligation bracket is exerting a low torqueing couple to the enclosed new archwire as disclosed herein.

FIG. 9B is a greatly enlarged, side elevation view of an adjustable, prior art passive self-ligation bracket which encloses the archwire of the new invention, and wherein the adjustable, passive self-ligation bracket is oriented so as to affect a neutral torqueing couple on the enclosed new archwire of the present invention.

FIG. 9C is a greatly enlarged, side elevation view of a prior art, adjustable, passive self-ligation bracket which encloses the archwire of the present invention, and wherein the adjustable, passive self-ligation bracket is oriented so as to affect a high torqueing couple on the enclosed new archwire of the present invention.

FIG. 11 is a greatly enlarged and simplified, side elevation view of one form of the present invention, and which illustrates the cooperation of an archwire of the present invention in combination with an archwire slot having the non-rectangular quadrilateral shape as illustrated.

FIG. 12 is a greatly enlarged and simplified, side elevation view of an orthodontic bracket, and which illustrates the cooperation of the new archwire as illustrated, with an archwire slot having a rectangular shape as illustrated, FIG. 13 is a greatly enlarged and simplified, side elevation view of an archwire of the present invention cooperating with an archwire slot having the non-rectangular quadrilateral shape as illustrated.

DETAILED DESCRIPTION OF THE PREFERRED EMBODIMENTS

This disclosure of the present invention is submitted in furtherance of the constitutional purposes of the U.S. Patent Laws "to promote the progress of science and useful arts" (Article 1, Section 8).

Figure 1:
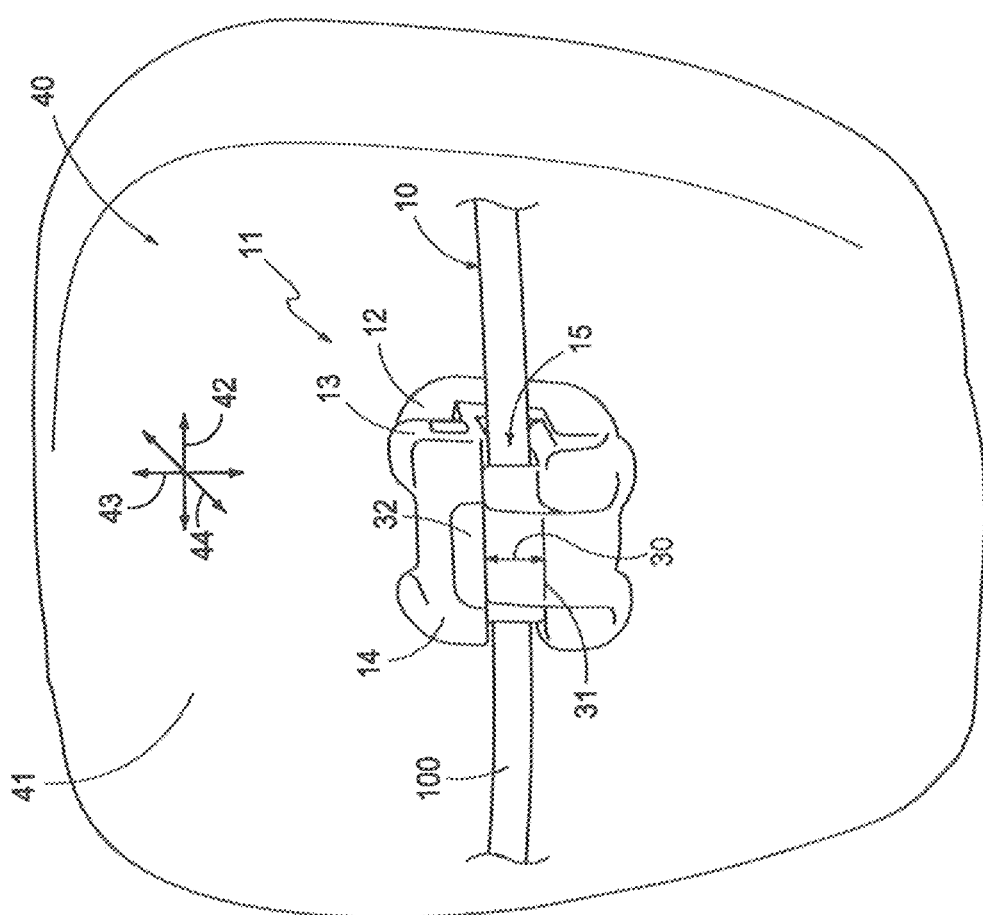
FIG. 1 is an enlarged, greatly simplified view of a patient's tooth having a passive self-ligating orthodontic bracket mounted thereon, and an archwire of the present invention extending therethrough, and cooperating therewith.
Figures 5A, 5B, 5C:
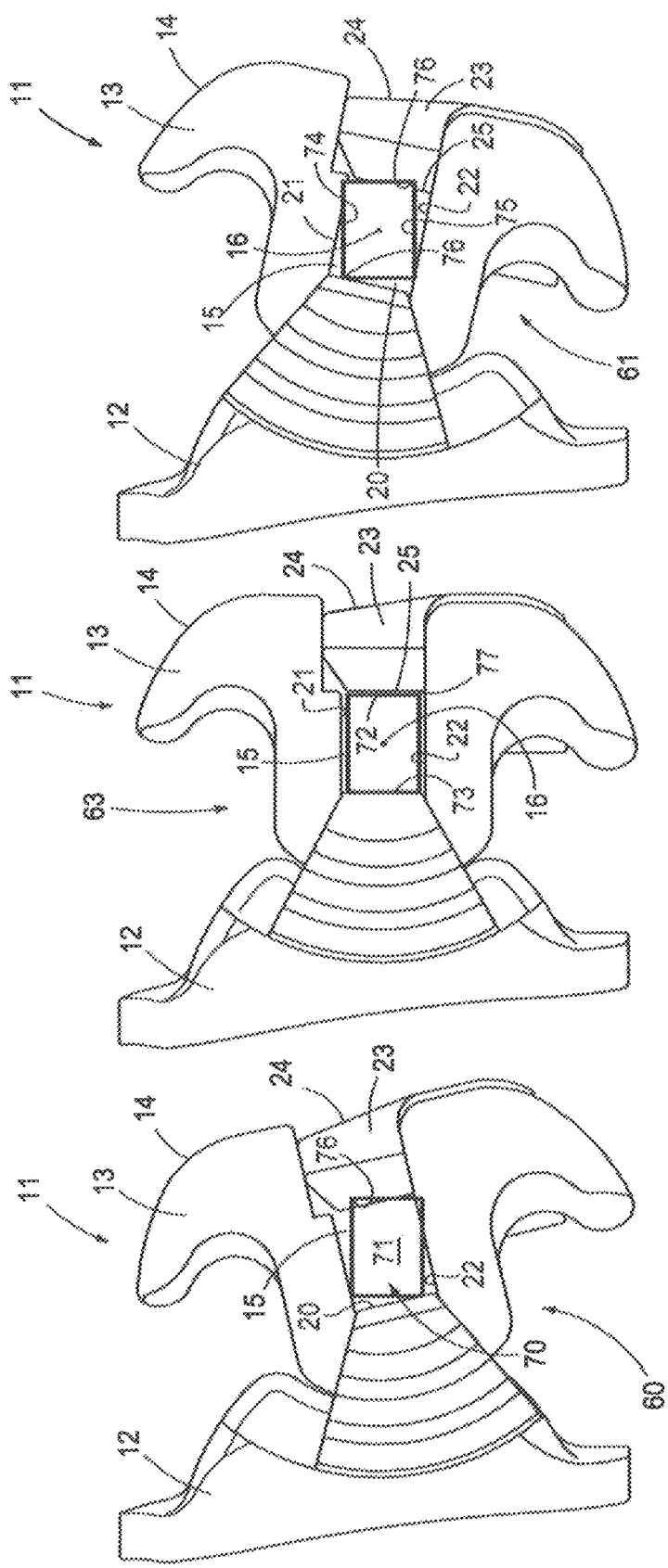
FIG. 5A is a greatly enlarged, side elevation view of a prior art adjustable, passive self-ligation bracket which encloses an enlarged rectangular cross-sectionally shaped archwire of traditional design, and wherein the adjustable, passive self-ligation bracket is oriented so as to exert a low torqueing couple on the enlarged cross-sectionally shaped archwire which is enclosed therein.
FIG. 5B is a greatly enlarged, side elevation view of a prior art adjustable, passive self-ligation bracket, and which encloses an enlarged rectangular cross-sectionally shaped archwire of traditional design, and wherein the adjustable passive self-ligation bracket is oriented so as to exert a neutral torqueing couple on the enlarged cross-sectionally shaped archwire of traditional design.
FIG. 5C is a greatly enlarged, side elevation view of a prior art, adjustable, passive self-ligation bracket which encloses an enlarged rectangular cross-sectionally shaped archwire of traditional design, and wherein the adjustable, passive self-ligation bracket is oriented so as to exert a high torqueing couple on the enclosed and enlarged archwire.
Figure 8:
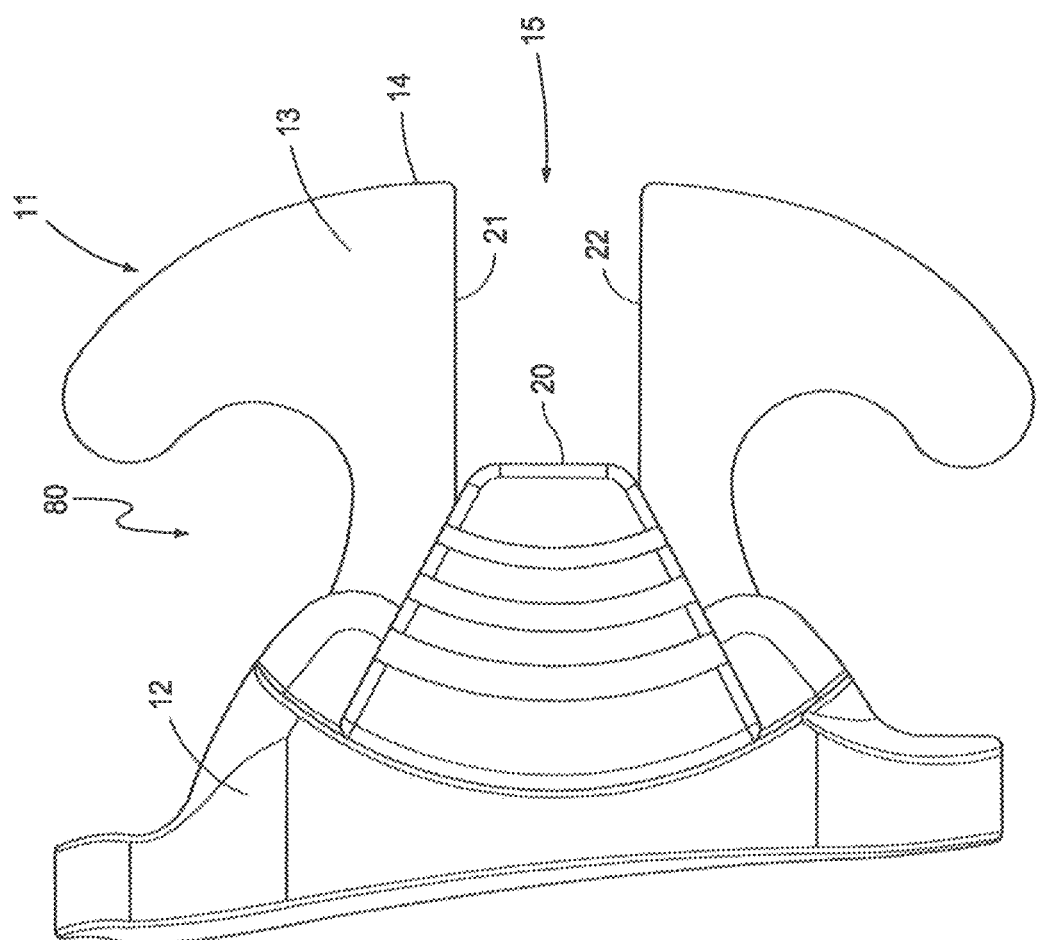
FIG. 8 is a greatly enlarged, side elevation view of a prior art, nonadjustable, passive self-ligation bracket which may utilize the new archwire of the present invention.
Figures 8A, 8B, 8C:
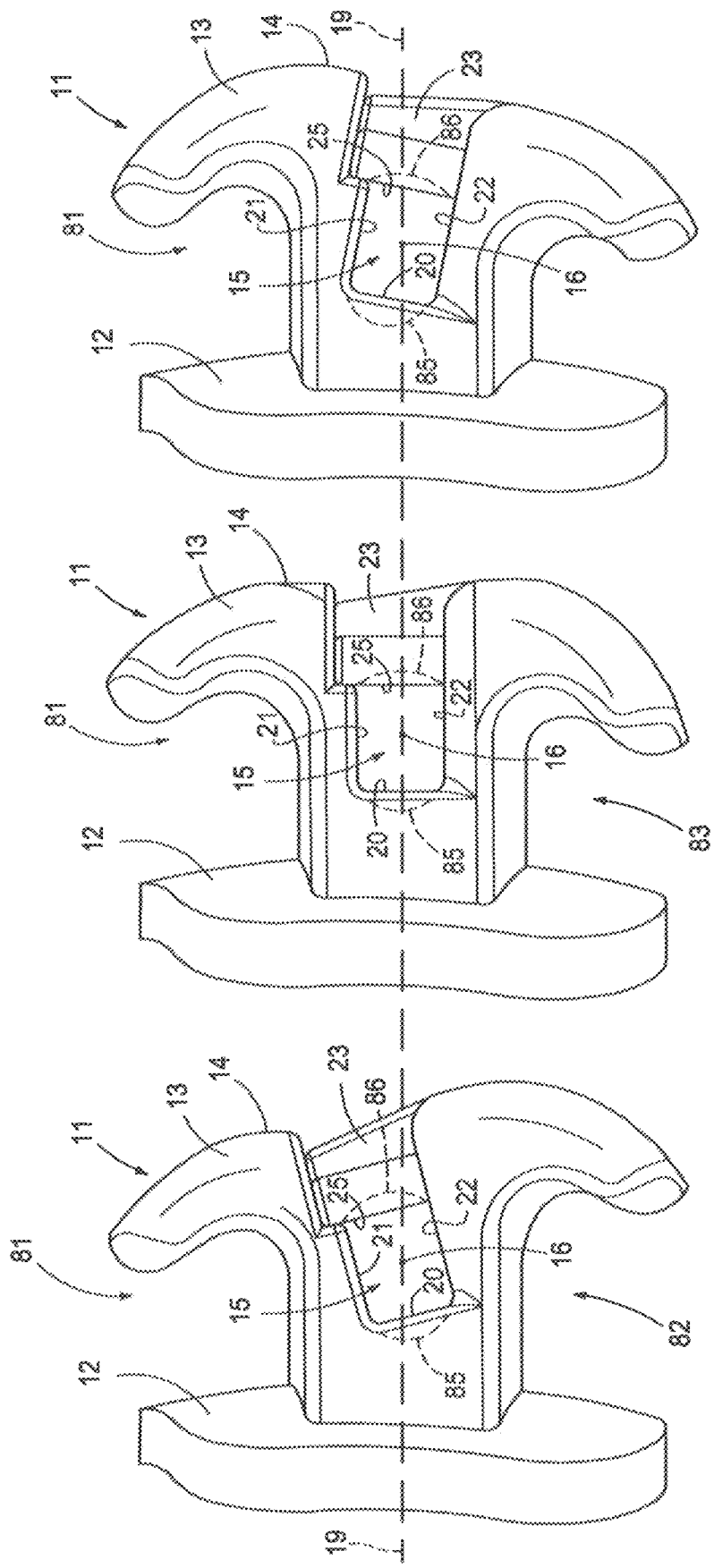
FIG. 8A is a greatly enlarged, side elevation view of a prior art, nonadjustable self-ligation bracket, and which is oriented so as to exert a low-torqueing force to a patient's tooth.
FIG. 8B is a greatly enlarged, side elevation view of a prior art, nonadjustable self-ligation bracket, and which is oriented so as to exert a neutral torqueing couple to a patient's tooth.
FIG. 8C is a greatly enlarged, side elevation view of a prior art, nonadjustable self-ligation bracket, and which is oriented so as to exert a high torqueing couple to a patient's tooth. Further a line extends through each of FIGS. 8A, 8B and 8C so as to demonstrate the ability of the aforementioned prior art nonadjustable self-ligation brackets to achieve a level, archwire slot line-up which achieves the benefits of the present invention.

The archwire for use with a passive ligating orthodontic bracket of the present invention is generally indicated by the numeral 10 in FIG. 1, and following. The archwire 10 of the present invention is operably used in combination with a passive, litigating bracket 11 of conventional design. As earlier disclosed, the adjustable orthodontic bracket as shown in many of the Figures is similar in design to that as seen and described in U.S. Pat. No. 9,198,740, and which issued on Dec. 1, 2015 to the present inventors, Doctors Paul Damon and Dwight Damon, Another form of an orthodontic bracket which may employ the present archwire is seen in FIG. 8, However, this orthodontic bracket is not adjustable when it is in use on a patient's tooth. FIGS. 8A, 8B and 8C show other forms of this nonadjustable passive self-ligation bracket and which impart other torque expressions, and which further achieve a level archwire slot orientation to achieve the benefits of the present invention. In the arrangement as seen in FIG. 1 and following, the passive ligating bracket 11 includes a bracket base 12, and a selectively moveable and/or adjustable bracket body which is generally indicated by the numeral 13. The bracket body has an anterior facing surface 14, and an archwire slot 15 is formed in the bracket body 13 and communicates with the anterior facing surface 14. Still further, the archwire slot 15 is defined, in part, by a central region 16, and further has a given width dimension 17, and a height dimension 18. The prior art litigating orthodontic brackets as seen in the drawings, whether adjustable (FIGS. 4A-4C); or nonadjustable (FIGS. 8A-8C) are illustrated in a fashion to show that the archwire slots 15 are located along a level line 19 which passes through the central region 16 of each archwire slot 15. This level slot line-up of the respective orthodontic brackets greatly enhances the operation of the new archwire 10 as will be discussed, below. The archwire slot 15 is further defined, in part, by an anterior facing surface 20 which is best seen in FIG. 5A, and following. The archwire slot 15 is also formed, in part, by a superior surface 21, an inferior surface 22, so as to form a three sided archwire slot 15 and is still further is defined, in part, by a posterior inwardly facing surface 25 of a moveable gate 23. When the movable gate 23 is in a closed position (FIGS. 11-16) the archwire slot 15 forms (in cross section) a four-sided quadrilateral shaped archwire channel 15 bounded by the anterior surface 20, the superior surface 21, the inferior surface 22 and the posterior inwardly facing surface 25 of the movable gate 23. The quadrilateral archwire channel 15 further has four angles between and joining the adjacent surfaces 20, 21, 22, and 25 and further still none of the angles are right angles. It should be understood from FIG. 1, and FIG. 5A, and following, and as further discussed in the aforementioned U.S. Patent, the passive self-ligating bracket 11 utilizes or employs a moveable gate 23 which is slidably mounted on the anterior facing surface 14 of the bracket body 13, and rendered moveable relative thereto. The moveable gate 23 has an anterior or outside facing surface 24 which may be frictionally engaged by a clinician, not shown, and further has an opposite, posterior facing surface 25 which forms, at least in part, a portion of the four-sided quadrilateral archwire slot or channel 15, and which encloses the archwire 10 of the present invention. As seen in the drawings, the moveable gate 23 is operable to travel along the path of movement 30 between a first non-occluding or open position 31, to a second occluding or closed position 32 (FIG. 1). In the second occluding or closed position 32 the moveable gate 23 encloses, at least in part, a portion of the archwire 10 of the present invention. Further, and when the bracket body 13 is moved to a given orientation relative to the bracket base, the enclosed archwire 10 is operable to impart forces to the bracket body 13 so as to affect first, second and third order movement of the patient's tooth upon which the passive litigating bracket 11 is mounted. The impartation of first, second and third order movements to the patient's tooth by the operation of the present invention 10 will be discussed in greater detail in the paragraphs which follow.

For purposes of the present invention, as described hereinafter, it will be understood that the various forms of the invention are to be employed in combination with a passive litigating orthodontic bracket 11 which is releasably affixed to a patient's tooth 40 as seen in FIG. 1, and in particular to the anterior facing surface 41 thereof. The passive litigating orthodontic bracket 11, in its various forms, and in combination with the archwire 10 as will be described, hereinafter, is employed to provide a multiplicity of selective torque expressions which individually, and forcibly act upon the patient's tooth 40. For purposes of this patent application the term "torque expression" as used hereinafter is defined as the force which provides rotation to a patient's tooth 40 around the X axis, and that being in the mesial/distal direction. In particular the passive litigating orthodontic bracket 11 can be employed to achieve first, second and third order movements that is 42, 43 and 44 respectively as seen in FIG. 1 without a clinically predetermined intentional manipulation, bending, twisting or other distortion of the archwire 10 out of or away from of the archwire's original configuration which is similar to a patient's dental arch as will be described hereinafter, or the often repeated replacement of the same archwire. 10 during the orthodontic treatment. One of the novel features of the present invention 10 relates to the fact that the new orthodontic archwire, 10 as will be described, hereinafter, can be placed in or otherwise enclosed within the passive litigating bracket 11 which is affixed to the tooth of the patient 40 without substantial bending or intentional distortion or other manipulation and which has been a prevalent practice for clinicians for decades. Further, and as will be discussed later in this patent application, the treatment of a patient may proceed to completion without the removal of the bracket base 12 from the patient's tooth 40, although the bracket body 13 which is releasably mounted on the bracket base 12 may be replaced with other bracket bodies during the treatment period based upon the clinical judgment of the treating clinician. The present invention 10 provides a novel means by which a clinician, by utilizing various means including different bracket body inserts (not shown), can readily adjust the cross sectional dimension of an archwire slot 15, achieves first, second and third order movements 42, 43 and 44 of the tooth of a patient 40, and thereby considerably shortens patient treatment times, achieves superior treatment results, and increases the patient's comfort in a manner not possible by utilizing the prior art appliances or practices which are known. Still further, and in the arrangement as seen in the present drawings, the adjustable, passive litigating bracket 11 of the present invention further receives the archwire 10, and is moveable in both the vertical and horizontal plane and has a central region 16, and wherein the rotation of the archwire slot 15 which is carrying the archwire 10, hi either the vertical or horizontal planes imparts simultaneous first, second and third order movements 42, 43 and 44, respectively, to the tooth 40 of the patient, and wherein the movement of the archwire 10 is substantially maintained about the central region 16 of the archwire slot 15. This is best seen by reference to FIGS. 8A, 8B and 8C respectively.

Figure 2:
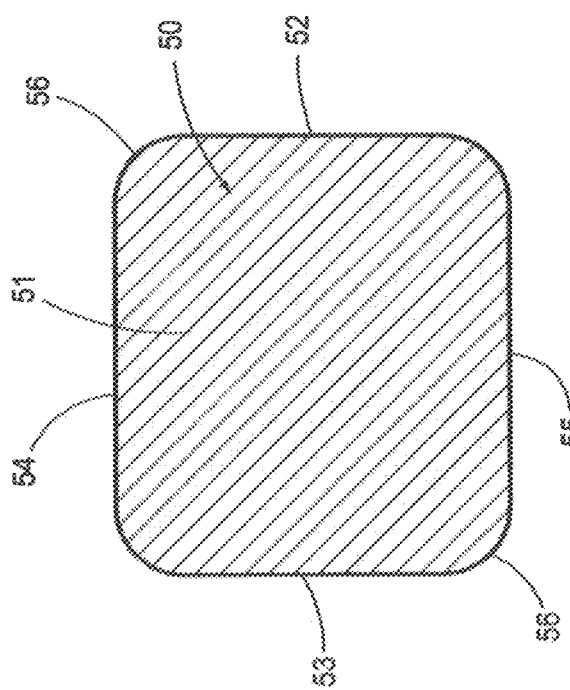
FIG. 2 is a greatly enlarged, transverse vertical cross-sectional view taken through a prior art rectangular-shaped archwire.

Referring now to FIG. 2, a greatly enlarged, transverse vertical cross-sectional view is illustrated of a prior art rectangular-shaped archwire 50, and which has been used, heretofore, in various orthodontic appliances for many years. The prior art rectangular-shaped archwire 50 has a main body 51, which is rectangular or square in cross section, and which further is resilient and provides a torqueing force which is transmitted to an associated bracket body 13 in order to impart movement to an underlying patient's tooth 40. The main body 51 has an anterior facing surface 52, and an opposite posterior facing surface 53. The main body further has a superior, and an inferior facing surfaces 54 and 55, respectively. Typically in rectangular-shaped archwires of this design, the rectangular-shaped archwire has four rounded edges, or corners, and which are generally indicated by the numeral 56. The archwire 50 is sized so as to be received, and operationally enclosed within, an archwire slot 15. This is best seen by reference to FIGS. 4A through 4C, respectively. In this regard, and as seen by reference to FIG. 4A, the problem associated with using a traditional, archwire 50 as seen in FIG. 2 is demonstrated. In this regard, and as earlier discussed in this patent application, clinicians have noted problems associated with using adjustable passive self-ligation brackets 11 of the present invention, and when attempting to insert or otherwise place a prior art rectangular shaped archwire 50 within the archwire slot 15. In particular and referring now to FIG. 4A, a first problem presents itself when the adjustable passive self-ligating orthodontic bracket 11 is positioned or oriented such that the bracket body 13 imparts a low torqueing couple 60 to the enclosed prior art rectangular-shaped archwire 50. As will be recognized from a study of FIG. 4A, and in this illustrated orientation, the bracket body 13 allows the insertion of the main body 51 within the archwire slot, however the movement of the moveable gate 23 along the path of movement 30, and between the first non-occluding position 31, to the second non-occluding position 32, may be impeded when one of the corners 56 of the main body 50 frictionally engages the posterior facing surface 25 of the moveable gate 23 as it approaches the second occluding position 32. Referring now to FIG. 4C, a similar problem presents itself when a prior art rectangular-shaped archwire 50 is attempted to be inserted within a passive self-ligation bracket 11, and where the passive self-ligation bracket is oriented so as to provide a high torqueing couple 61 to the enclosed prior art rectangular shaped archwire 50. In this regard, the high torqueing couple 61 causes, yet again, one of the corners 56 of the main body 51 of the prior art rectangular-shaped archwire 50 to frictionally engage the posterior facing surface 25 of the moveable gate 23. Referring now to FIG. 4B, a greatly enlarged side elevation view is seen of a passive self-ligation bracket 11, and which is oriented so as to provide a neutral torqueing couple 63 to the enclosed prior art rectangular-shaped archwire 50. The reader should note the significant gap or space 64 which is located between the anterior facing surface 52 of the main body 51, and the posterior facing surface 25 of the moveable gate 23. This gap 64 contributes or otherwise effects, to some degree, the amount of first order movement control 42 that a clinician can impart to an associated tooth 40 when a prior art rectangular-shaped archwire 50 is employed in a passive self-ligation bracket 11 as illustrated.

Referring now to FIGS. 5A, 5B and 5C respectively, what is depicted is a prior art passive, adjustable self-ligation bracket 11 of conventional design, and which is shown, in FIG. 5A as providing a low torqueing couple 60; a neutral torqueing couple 63 in FIG. 5B; and a high torqueing couple 61 in FIG. 5C. FIGS. 5A through 5C are provided so as to illustrate the prior corrective actions that clinicians have taken in order to maintain first order control 42 over a patient's tooth 40, in view of the problems associated with using smaller dimensioned square or rectangular archwires as seen in FIGS. 4A, 4B and 4C respectively. As noted earlier, and in order to address the problem associated with the closing or opening of the moveable gate 23, clinicians have often resorted to using smaller dimensioned rectangular-shaped archwires 50 as seen in FIGS. 4A-4C. However, the use of such smaller dimensioned rectangular-shaped archwires 50 has caused a gap or space 64 (FIG. 4B) to be created between the anterior facing surface 52 of the main body 51, and the posterior facing surface 25 of the moveable gate 23. This gap, while allowing the moveable gate 23 to move along the path of movement 30, sacrificed a portion of the first order movement control 42 that the clinician was able to exert over the tooth of the patient 40. As seen in FIGS. 5A, 5B and 5C respectively, to reestablish, or further to fully implement or establish complete first order of control 42 on the patient's tooth 40, clinicians have often used a larger dimensioned archwire 70. The larger cross-sectionally dimensioned and rectangular-shaped archwire has a main body 71 having anterior and posterior facing surfaces 72 and 73 respectively; and superior and inferior facing surfaces 74 and 75 respectively. Similar to the smaller dimensioned archwire 50, the larger cross-sectionally dimensioned and rectangular shaped archwire has corners 76 which, when the bracket body 13 is adjustably moved into positions so as to implement a low torqueing couple 60, or a high torqueing couple 61 to the prior art enlarged rectangular-shaped archwire 70, the corners 76, as indicated, in the drawings often frictionally engaged the posterior facing surface 25 of the moveable gate 23 thereby inhibiting the closing or opening of the moveable gate 23. Referring now to FIG. 5B it will be seen that the larger cross-sectionally shaped archwire 70 substantially eliminated the gap 64 as seen in FIG. 4B and thereby reestablished first order control 42. However the earlier mentioned problem of closing the gate 23 remained.

Referring now to FIG. 8, a nonadjustable, passive self-ligation bracket 11 of traditional design is shown, and is labeled by the numeral 80, the nonadjustable passive self-ligation bracket 11, as shown, is fabricated so as to provide a neutral torqueing couple to an archwire 10 which might be received within the archwire slot 15. The non-moveable passive self-ligation bracket and which is similar to what is seen in FIG. 8, can be fabricated in separate forms so as to provide either a high torqueing couple or a low torqueing couple to an enclosed archwire 10. (FIGS. 8A and 8C). However, in order to employ a nonadjustable passive self-ligation bracket 11 as seen in FIG. 8, the clinician would be required to remove the entire bracket 11 from the anterior facing surface 41 of the tooth 40 when changing torque expressions.

Referring now to FIGS. 8A, 8B and 8C respectively, several prior art nonadjustable self-ligation brackets are illustrated and which are generally indicated by the numeral 81. As seen in FIG. 8A a prior art nonadjustable self-ligation bracket is shown and which, when operably cooperating with an enclosed archwire (not shown), imparts a low torqueing couple 82 to patient's tooth 40. FIG. 8B shows a similar prior art nonadjustable self-ligation bracket 81, and which is oriented so as to impart a neutral torqueing couple 83 to an archwire (not shown). Further in FIG. 8C the same form of a nonadjustable, self-ligation orthodontic bracket 81 is illustrated in an orientation so as to impart a high torqueing couple 84 to an archwire (not shown). As seen in FIGS. 8A-8C a line labeled 19 extends through each view and further passes through the central region 16 of each archwire slot 15. The illustrated prior art self-ligation orthodontic brackets 81 are able to achieve a level archwire slot 15 orientation notwithstanding the torque expression the orthodontic bracket 81 is designed to impart. As should be appreciated, this feature permits the archwire 10 to be inserted in the archwire slot 15 with minimal bending, and further allows the present archwire 10 to impart increased, and clinician controllable torque which enhances the clinician's ability to achieve the desired tooth 40 movement, and proper orientation and inclination in shorter treatment times. Yet further the level archwire slot orientation facilitates the orientation of the top and bottom of the pads (not shown) and which are mounted on the bracket base 12, so as to align them in the same orientation on adjacent teeth for all of the torques for a single tooth 40. This greatly assists in the proper placement of the orthodontic bracket 11 on the respective teeth 40.

Referring still to FIGS. 8A, 8B and 8C, another possible, and new feature of the present invention is seen, and wherein, in one new, possible form of the passive self-ligation orthodontic bracket, as illustrated, a new passive self-ligation bracket could be fabricated and which includes an archwire slot 15 which is defined, in part, by a concavely curved anterior facing surface 85; and/or a concavely curved posterior facing surface 86 of the moveable gate 23. Both surfaces 85 and 85 are shown in phantom lines. The use of such a bracket design would permit a clinician to utilize larger cross-sectionally shaped rectangular or square shaped archwires of traditional designs, but would avoid the earlier problems associated with inhibiting the travel or movement of the moveable gate 23.

Figure 6:
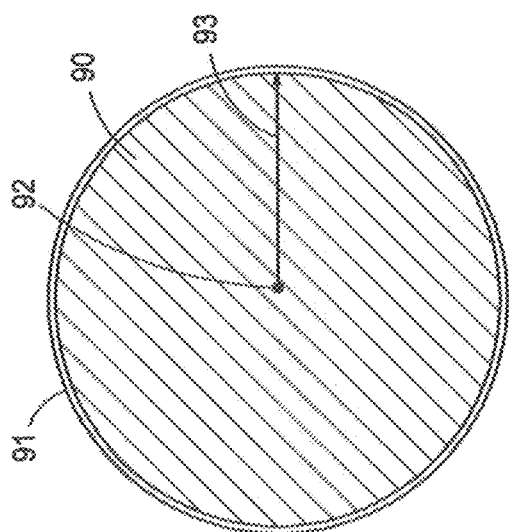
FIG. 6 is a greatly enlarged, transverse vertical cross-sectional view of a traditional, circular shaped archwire which has been employed in various orthodontic appliances heretofore.

Referring now to FIG. 6 a greatly enlarged, transverse vertical cross-sectional view which is taken through an archwire of traditional design is shown. FIG. 6 depicts a circular cross sectional archwire 90, and wherein the archwire 90 has a circumferential outside facing surface 91, a longitudinal axis 92, and a radial dimension of the archwire 90 is generally indicated by the numeral 93. The circular, cross-sectionally shaped archwire 90 has a substantially uniform radial dimension 93 when measured along the line extending from the longitudinal axis 92 to the outside facing surface 91 thereof. It should be understood that the circular, cross-sectionally shaped archwire 90 has been utilized in various orthodontic appliances through the years. However, such circular cross-sectionally shaped archwires 90 have traditionally not been employed to effect significant third order movement 44 of the tooth of the patient 40. Instead, clinicians have resorted to the use of rectangular or square shaped archwires such as 50 and 70, in order to generate torqueing couples which have been effective to implement first, second and third order movements 42, 43 and 44 of a patient's tooth 40.

Figure 3:
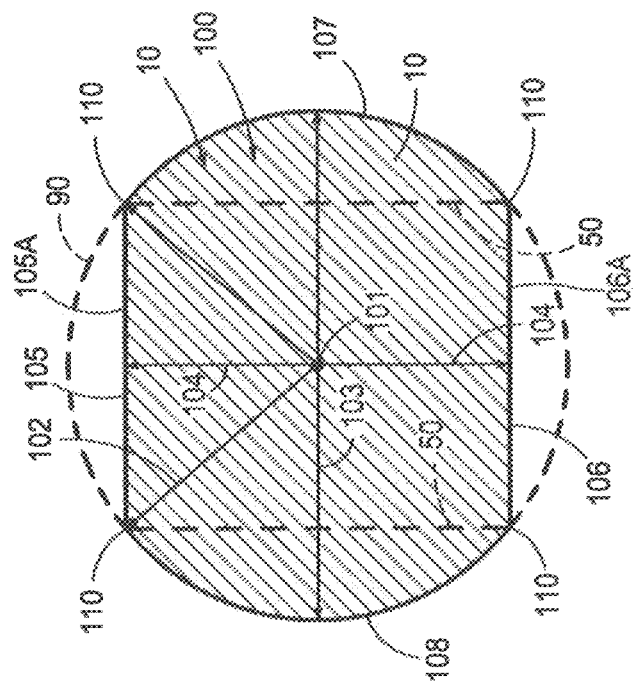
FIG. 3 is a greatly enlarged, transverse vertical cross-sectional view of a circular-square or circular-rectangular shaped archwire of the new invention.
Figure 7:
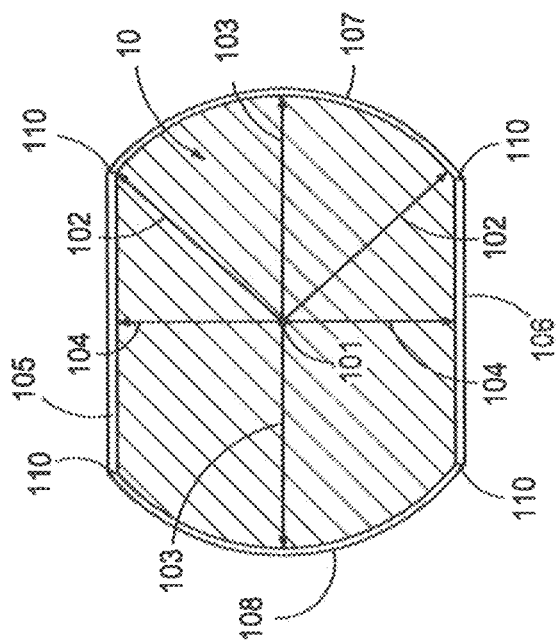
FIG. 7 is a greatly enlarged transverse vertical cross-sectional view of the circular-square or circular-rectangular shaped archwire of the present invention.

Referring now to FIGS. 3 and 7, the archwire of the present invention 10 is shown therein in a greatly enlarged cross-sectional view. In this regard, the archwire 10 of the present invention has a circular-square or circular-rectangular cross-sectionally shaped main body 100. The circular-square or circular-rectangular cross-sectionally shaped main body 100 is resilient, and defined, in part, by a longitudinal axis, and which is generally indicated by the numeral 101. It should be understood that the circular-square or circular-rectangular main body 101 is formed from a circular cross-sectionally shaped archwire 90 by a fabrication technique which removes a portion of the outside facing surface 91 of the circular cross-sectionally shaped archwire 90. The removed portion of the previous circular shaped archwire 90 is shown in phantom lines in FIG. 3. The main body 100 has a radial dimension 102 which, in one form of the invention, may remain constant when measured from the longitudinal axis 101 to the curved outwardly facing surfaces of the main body 100, and further has a width dimension 103 which is measured along a line which extends through the longitudinal axis, and between convexly curved outwardly facing surfaces, as described below. As seen in FIGS. 3 and 7 the circular-square or circular-rectangular shaped main body 100 of the new archwire 10 has a thickness dimension 104 which is measured between the substantially planar, and parallel oriented superior and inferior facing surfaces 105 and 106, respectively. Further, and as discussed, above, the main body 100 includes a first anterior facing, and convexly curved surface 107; and an opposite, second, posterior facing convexly curved surface 108. The pair of convexly curved surfaces 107 and 108, respectively, join the superior and inferior facing planar surfaces 105 and 106 at discreet angular edges or regions which are generally indicated by the numeral 110. As will be appreciated from a study of FIG. 3, the respective superior and inferior facing surfaces 105 and 106, respectively, each have a width dimension which is less than the width dimension 103 when measured along a line extending between the first and second convexly curved surfaces 107 and 108, and which is located midway between the superior and inferior facing surfaces 105 and 106, respectively. This reduced width dimension as measured across the superior and inferior facing surfaces 105 and 106, and between the angular edges or regions 110 which form at least in part the peripheral edge of the superior and inferior facing surfaces allows a clinician to maintain consistent first order movement control 42 of the tooth of the patient 40 while simultaneously allowing the clinician to adjustably apply a different amount of force to the orthodontic bracket 11 so as to achieve a clinician selectable and controllable second and third order movements 43 and 44. This adjustable second and third order movement is further achieved by varying the thickness dimension 104 of the main body 100, as will be described in the paragraphs which follow. The superior and inferior facing surfaces 105 and 106 lie along parallel chords 105A and 106A, respectively, of the previously circular shaped archwire 90 and which is depicted in phantom lines in FIG. 3, and which is subsequently machined into the shape as seen in FIG. 3.

Referring now to FIGS. 3 and 9A, 9B and 9C, respectively, the important features and operation of the present archwire 10 can be seen, and more fully appreciated. In particular and referring to FIGS. 9A, 9B and 9C, respectively, it will be understood that the circular square, or circular-rectangular shaped main body 100 of the archwire 10 comprises features of both a traditional rectangular-shaped archwire 50, as well as a traditional circular cross-sectionally shaped archwire 90, as earlier disclosed. Referring now to FIG. 3 it will be seen that the cross-sectional shape of the prior art rectangular shaped archwire 50 is indicated by phantom lines within the main body of 100 of the new archwire 10. The cross-sectional shape of the square or rectangular-shaped archwire 50 is defined between the angular edges or regions 110, and which form a portion of the main body 100. Further, it will be appreciated from studying FIG. 3 that the first and second convexly curved surfaces 107 and 108 are oriented at the same radial distance as the circumferential outside facing surface 91 of the circular cross-sectionally shaped archwire 90 as seen in FIG. 6. Consequently, the performance or operation of the new archwire 10 includes features or characteristics which are expected or seen in traditional archwires, such as the rectangular-shaped archwire 50; and the circular cross-sectionally shaped archwire 90 (FIG. 6). Referring to FIGS. 9A, 9B and 9C respectively, the operation of the new archwire 10 will now be understood.

Referring first to FIG. 9A, the main body 100 of the new archwire 10 is received in an archwire slot 15 as defined by a prior art adjustable, passive self-ligation bracket 11 of traditional design. As illustrated in this fragmentary view, the bracket body 13 is shown in an angular orientation relative to an associated bracket base 12 (not shown) so as to impart a low torqueing couple 120 to the main body 100. As will be appreciated from studying FIG. 9A it will be understood that the first and second convexly curved surfaces 107 and 108, respectively, are individually disposed in closely adjacent, juxtaposed relation relative to the anterior facing surface 20 of the archwire slot 15, and the posterior facing surface 25 of the moveable gate 23 when the moveable gate is located in an occluding position 32 relative to the archwire slot 15. As will be appreciated from studying FIG. 9A, this closely associated juxtaposed positioning of the first anterior facing convexly curved surface 107, and the second, posterior facing convexly curved surface 108 relative to the adjacent surfaces enables a clinician to consistently maintain first order control 42 when the passive self-ligation bracket 11 is oriented so as to provide a low torqueing couple 120 to the enclosed archwire 10. However, it is important to recognize that because of the orientation of the first and second convexly curved surfaces 107 and 108, the moveable gate 23 is not frictionally impeded in moving or traveling between the first non-occluding position 31, to the second occluding position 32, or vice versa, as illustrated. As earlier discussed, and in employing a rectangular or square shaped archwire having a cross-sectional dimension which would substantially fill the interior region of the archwire slot 15, and in a low torqueing couple arrangement 60 as seen in FIG. 5A, for example, the movement of the gate 23 to the occluding position 32 was substantially impeded because the larger rectangular shape which ensured first order control 42 would substantially frictionally resist the movement of the gate 23 to the fully occluded position 23. As will be readily recognized from studying FIG. 9A, torqueing couples are still capable of being made because the angular edges or regions 110 are still able to make forcible contact with the superior surface 21, and inferior surface 22, and which define, in part, the archwire slot 15. It will be recognized, therefore, that the unique shape of the circular-square or circular-rectangular shaped main body 100 allows torqueing couples to be established but further avoids the problems associated with using a larger cross-sectionally sized archwire which can impede the movement or travel of the moveable gate 23 to the occluding position 32. A similar situation arises relative to the operation of the archwire 10 when the archwire 10 is received in a passive, adjustable self-ligation bracket 11 as seen in FIG. 9C, and wherein a high torqueing couple 121 is being imparted to the enclosed archwire 10. Again, the unique shape of the archwire 10 allows a clinician to maintain first order control 42, while simultaneously allowing the archwire 10 to be inserted in the archwire slot 15, and the moveable gate 23 is subsequently moved to an occluding position 32 without being frictionally impeded in the manner as seen in FIG. 5C. As seen in FIG. 9B, the passive, adjustable self-ligation bracket 11 is illustrated as it would be seen when the new archwire 10 is received in a bracket body 13 and which is oriented so as to provide or impart a neutral torqueing couple 122 to the enclosed archwire 10. Again, the unique shape of the new archwire 10 permits the clinician to consistently maintain first order control notwithstanding the relative position or orientation of the bracket body 13.

The inventors of the present invention have discovered that varying the thickness dimension 104, of the main body 100 of the circular-square or circular-rectangular shaped main body of the new archwire 10 provides a means by which the clinician can adjustably impart a given torqueing force to the passive self-ligation bracket 11 so as to provide selective second and third order movement control 43 and 44 to the tooth of the patient 40 while maintaining consistent first order control 42. In this regard it should be understood that the archwire slot 15 of the passive self-ligation bracket 11 has a predetermined height dimension 18, and the archwire slot 15 is defined, at least in part, by a pair of spaced, planar and substantially parallel superior and inferior surfaces 21 and 22 respectively. Still further the archwire slot 15 has a given width dimension 17, which is measured between the anterior facing surface 20, and the posterior facing surface 25 of the moveable gate 23. As earlier discussed the superior and inferior facing surfaces 105 and 106 respectively of the archwire 10 define the thickness dimension of the main body 100 of the circular square or circular rectangular main body 100. In the arrangement as seen in the drawings, the new archwire 10 has a width dimension 103 which is less than the width dimension 17 of the archwire slot 15; and the archwire 10 has a thickness dimension 104 which is at least about 55% of the height dimension of the archwire slot 15. As noted earlier, the overall shape of the archwire 10 is such that the archwire consistently maintains first order movement of the tooth 40 of the patient. However, as the thickness of the archwire 10 is reduced, lighter forces are generated by the archwire 10 on the tooth 40. In the arrangement as seen in the drawings, the selective increasing of the thickness dimension 104 of the archwire 10 to greater than 55% of the height dimension of the archwire slot 15 imparts an adjustable, and increasing amount of a torqueing force to the passive, adjustable self-ligation bracket 11 so as to provide selective second and third order movements 43 and 44 respectively to the tooth of the patient 11. This allows a clinician to achieve a superior, finished treatment and alignment of the patient's teeth in a minimum of treatment time and using lighter force. This feature substantially increases patient comfort.

Figure 10B:
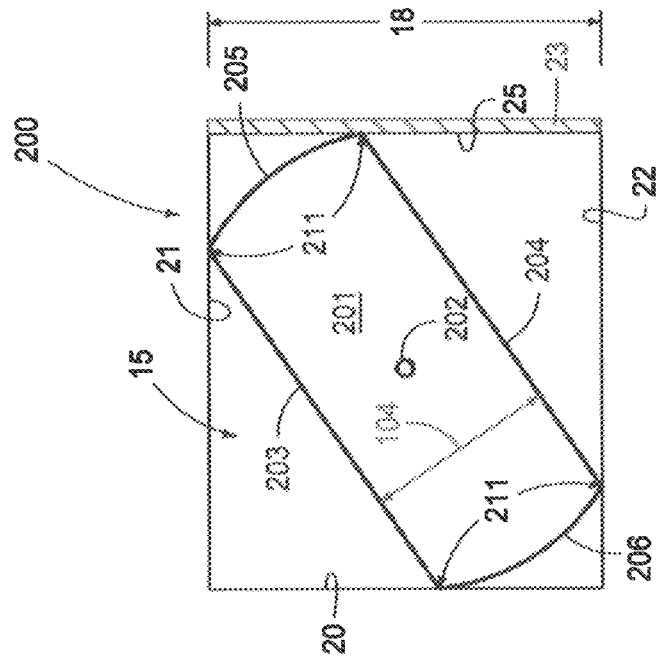
FIG. 10B is a greatly enlarged and graphically simplified depiction of a second form of the new archwire of the present invention, and which is illustrated as being depicted only generally within a graphically simplified archwire slot, and wherein the new form of the archwire is shown oriented in a fashion where a high torqueing couple is being imparted to the new archwire of the present invention.
Figure 10A:
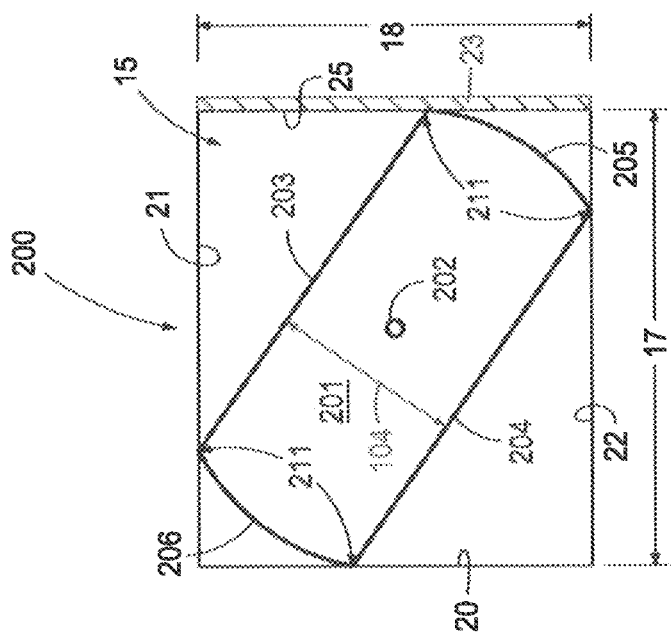
FIG. 10A is a greatly enlarged, simplified, graphical depiction of yet another form of the new archwire of the present invention, and wherein the archwire is shown in an operable orientation relative to only a minimally graphically depicted archwire slot, and associated moveable gate, and wherein a low torqueing couple is being imparted to the second form of the archwire as shown.

Referring now to FIGS. 11-16 respectively, the new archwire 10 of the present invention is generally indicated by the numeral 200 in those views. As discussed in the paragraphs, above, the new archwire 200 of the present invention 10 has a selective thickness dimension 104 between a planar superior surface 105 and an opposing planar inferior surface 106 which provides a convenient means for a clinician to exert predetermined amounts of variable torque so as to provide selective second and third order movement 43 and 44 to a patient's tooth 40, and while simultaneously maintaining first order control 42. The selective amount of torque is achieved by varying the thickness dimension 104. The thickness dimension 104 of any selected archwire 200 is uniform along the entire length of the archwire 200. The archwire 200 as seen in FIGS. 11-16 shows one type of archwire configuration that can be utilized in order to generate very small, but precise amounts of torque so as to provide the final, finish movements of the patient's teeth and which achieves superior tooth alignment. As seen in FIGS. 10A and 10B an enlarged, very fragmentary, and simple graphically depicted archwire slot 15 having a square configuration is illustrated, and which is occluded by a moveable gate 23, only the posterior surface 25 of which is shown. The second form of the archwire 200 has a main body 201, and which is defined, in part, by a longitudinal axis 202. Again, the main body 201 has a superior facing surface 203, and an opposite, inferior facing surface 204. The thickness dimension 104 of the main body 201 is measured, again, between the superior and inferior surfaces 203 and 204, respectively, Still further the main body 201 has an anterior, convexly curved surface 205; and an opposite convexly curved posterior facing surface 206. As with the other form of the invention, the anterior facing surface 205 is positioned in closely spaced, juxtaposed relation relative to the posterior facing surface 25 of the moveable gate 23. Further, the convexly curved posterior facing surface 206 is located in an adjacent, juxtaposed relationship relative to the anterior facing surface 20 of the archwire slot 15. Again, the main body 201 has a multiplicity of angulated edges or regions 211 which define the peripheral edges of the superior facing surface 203, and the opposite inferior facing surface 204. As can be seen in the drawings, and in a low torqueing position (FIG. 10A) it will be seen that the various angulated edges or regions 211 are operable to engage both the superior surface of the archwire slot 21, and the inferior surface 22, thereof. Notwithstanding this engagement, it will be seen that the anterior facing, convexly curved surface 205 still permits the posterior facing surface 25 of the moveable gate 23 to pass by. Similarly when studying Hg. 10B, and which is shown in a high torqueing position, the archwire 200, again, is able to deliver the torqueing force necessary while simultaneously allowing the moveable gate 23 to pass thereby. It should be appreciated that as the thickness dimension 104 of the main body 201 is reduced, the amount of torque that the archwire 200 can impart to the bracket body 13 is further reduced. Thus a clinician, by selecting various thicknesses 104 of archwire 10, can deliver refined and selective amounts of torque in order to provide fine finish control and achieve superior tooth alignment and position in a manner not possible heretofore.

Operation

The operation of the described embodiments of the present invention are believed to be readily apparent, and are briefly summarized at this point. In its broadest aspect the present invention relates to an archwire 200 for use with a passive litigating orthodontic bracket 11, having a non-rectangular quadrilateral shaped archwire slot or channel 15, and the archwire 200 further includes an elongated resilient main body 100 with uniform width dimension 103 and a uniform thickness dimension 104 along the entire length of the main body 100, and which is dimensioned to be received within the four sided quadrilateral archwire channel 15 of the passive ligating bracket 11, and wherein the resilient main body 100 of the archwire 200 has a circular-square or circular-rectangular cross-sectional shape having a single continuous predetermined circumferential width dimension 103; and a single continuous predetermined thickness dimension 104 extending along its entire length. The circumferential width dimension 103 of the resilient main body 100 maintains a consistent first order movement control 42 of a tooth 40 of a patient when the resilient main body 100 of the archwire 10 is cooperating with the passive ligating bracket 11. The single continuous predetermined thickness dimension 104 of the archwire 200 facilitates application of a force to the passive ligating orthodontic bracket so as to achieve a clinician selectable and controllable, second and third order movements 43 and 44, respectively, of the tooth 40 of the patient.

Another aspect of the present invention relates to a new and inventive archwire 200 for use with a passive ligating orthodontic bracket 11, which defines a four sided quadrilateral archwire channel 15, and the archwire 200 further includes an elongated and resilient main body 100 which is dimensioned to be received within the archwire channel 15 of the ligating orthodontic bracket 11 with no, or minimal bending or intentional distortion of the archwire 200 from an original configuration that is similar to a dental arch of a patient's mouth and which additionally has a single continuous circular-square or circular-rectangular cross-sectional shape along its entire length. The resilient main body 100 has a predetermined thickness dimension 104 which, when received in the four sided quadrilateral archwire channel 15, and cooperating with the passive ligating orthodontic bracket 11 exerts a force which is based, at least in part, upon the thickness dimension 104 of the resilient main body 100 of the archwire 200, and which further effects first, second or third order movements 42, 43 and 44 respectively of a tooth 40 of a patient upon which the passive ligating orthotic bracket 11 is attached.

Figure 14:
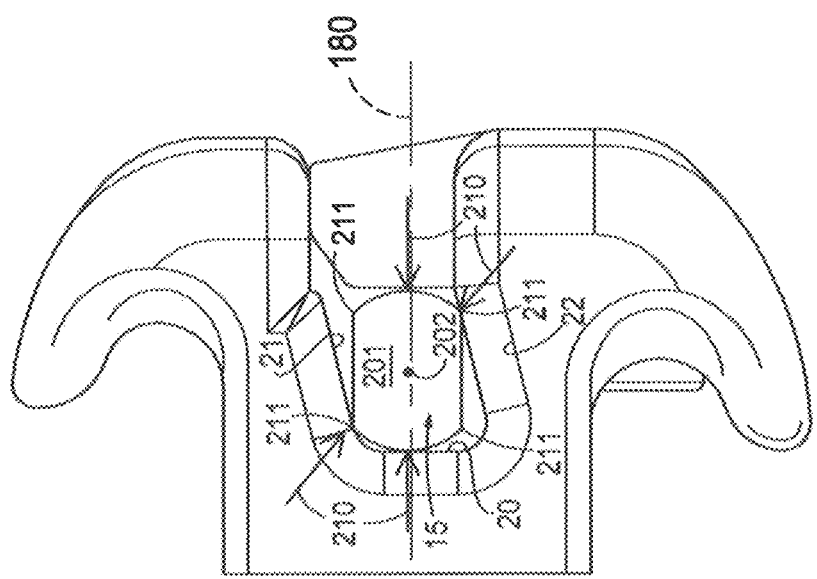
FIG. 14 is a greatly enlarged, side elevation view of a passive ligation orthodontic bracket, and which is operable to exert a high torque couple.
Figure 15:
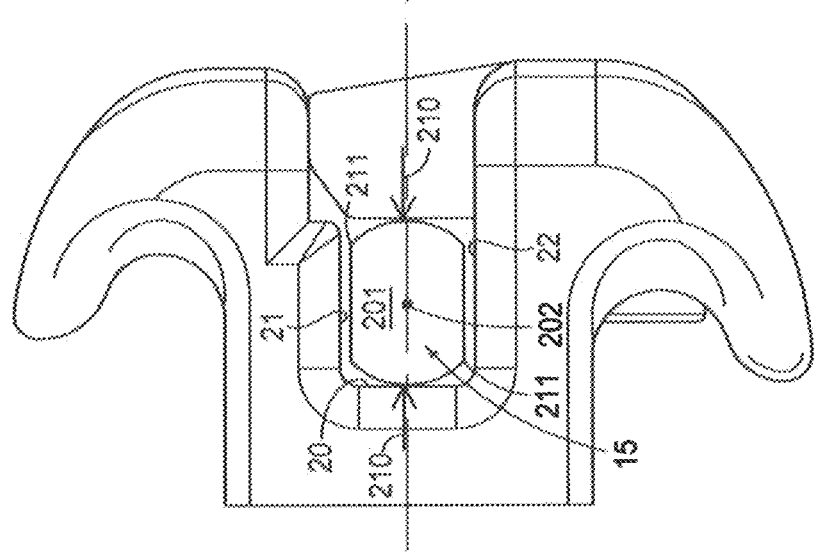
FIG. 15 is a greatly enlarged, side elevation view of a passive ligation orthodontic bracket, and which is operable to express a standard, neutral or no torque couple.
Figure 16:
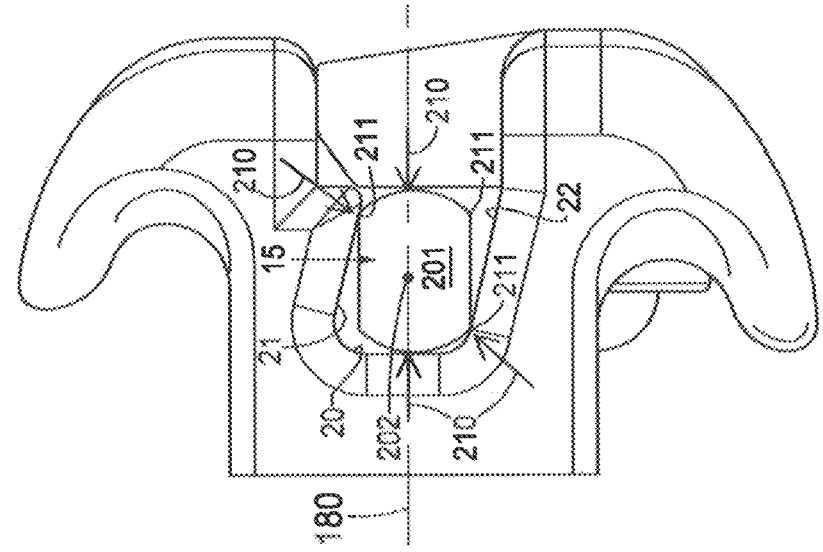
FIG. 16 is a greatly enlarged, side elevation view of yet another form of the orthodontic bracket of the present invention, and which is operable to exert a low torque couple.

The archwire slot 15 is defined, at least in part, by a superior, inwardly facing surface 21 which is formed from, or in the bracket body 13; and an opposite, spaced, inferior facing surface 22 of the same bracket body 13. These aforementioned surfaces 21, 22 are substantially parallel to each other, Still further, the archwire channel 15 is defined, at least in part, by an anterior facing surface 20 of the bracket body 13, and which is further disposed in parallel, spaced relation relative to the posterior facing surface 25 of the moveable gate 23. The archwire slot 15 has a generally, cross-sectional, quadrilateral shape which is defined by four angles, which are not right angles. At least some of the angles may have rounded corners. These rounded corners have a given curvature or radius which enhances the strength of the bracket body 13. In one possible form of the invention, the cross-sectional shape of the archwire channel 15 may take on the form of a parallelogram, and in another possible form of the invention, the cross-sectional shape of the archwire channel 15 may take on the shape of a rhomboid. For purposes of this patent application, the definition of a parallelogram includes a structure or shape having opposite pairs of substantially parallel sides, and wherein the opposite pairs of parallel sides are each of substantially equal length. On the other hand, a rhomboid shape includes structures or shapes which have opposite pairs of sides that are substantially parallel in orientation, but the opposite pairs of sides each have different lengths. The center 16 of the archwire channel 15 is coaxial with the longitudinal axis 202 of the archwire 200 and is aligned with level archwire slot line up 180, as seen in FIGS. 14-16.

In the present invention 10 the archwire slot 15 of the passive self-ligation bracket 11 has a predetermined height dimension 18, and the archwire 10 is defined, at least in part, by a pair of spaced, planar substantially parallel, superior and inferior facing surfaces 105 and 106, respectively, and a pair of spaced, convexly curved anterior and posterior facing surfaces 107 and 108. The archwire slot 15 has a predetermined width dimension 17, and the archwire 10 has a width dimension 103 which is less than the width dimension 17 of the archwire slot 15. The archwire 10 has a thickness dimension 104 when measured between the superior and inferior facing surfaces 105 and 106, respectively, and which is at least 55% of the height dimension 18 of the archwire slot 15. The archwire 10 consistently maintains first order movement 42 of the patient's tooth 40. In the arrangement as seen in the drawings, selectively increasing the thickness dimension 104 of the archwire 10 to greater than about 55% of the height dimension 18 of the archwire slot 15 typically imparts an increasingly adjustable amount of a torqueing force to the passive self-ligation bracket 11 so as to provide selective, second and third order movement 43 and 44, to the patient's tooth 40.

The passive, self-ligation orthodontic bracket 11 mounts a moveable gate 23 which selectively occludes the archwire slot 15. As earlier discussed, the moveable gate 23 has a posterior facing surface 25. The archwire slot 15 is defined, at least in part, by a vertically oriented, anterior facing surface 20. The pair of spaced, convexly curved surfaces 107 and 108, respectively, and which define, at least in part, a portion of the archwire 10 are individually located in closely spaced, juxtaposed relation relative to the anterior facing surface 20 of the archwire slot 15, and the posterior facing surface 25 of the moveable gate 23, when the moveable gate 23 is oriented so as to occlude 32 the archwire slot 15. In the arrangement as seen in the drawings, the passive, self-ligating orthodontic bracket 11 imparts a low torqueing couple; a high torqueing couple; or a neutral torqueing couple 120, 121 and 122, respectively, to the enclosed archwire 10 so as to effect, at least in part, first, second and third order movements 42, 43 and 44, respectively, to the tooth 40 of a patient during an orthodontic treatment regimen.

As earlier described, the archwire 10 of the present invention is defined, in part, by superior and inferior facing surfaces 105 and 106, respectively, and wherein in one form of the invention, the respective superior and inferior facing surfaces have a similar cross-sectional dimension. In another possible form of the invention the superior and inferior facing surfaces of the archwire 10 each have a different cross-sectional dimension. In still another form of the invention 10 the resilient main body 100 of the archwire 10 has a longitudinal axis 101, and wherein a radial dimension 102 of the archwire 10 when measured along a line extending radially, outwardly from the longitudinal axis 101, and to the respective convexly curved surfaces 107 and 108, respectively, is constant. In still another form of the invention the radial dimension 102 as measured from the longitudinal axis 101, and along a line to the first and second convexly curved surfaces 107 and 108 respectively is variable.

Another aspect of the present invention relates to an archwire 10 for use with a passive self-ligation orthodontic bracket 11, and which has an archwire slot 15, and which further includes an elongated and resilient main body 100 which is received within the archwire slot 15 with a minimal amount of bending. The archwire slot 15 has a width and height dimension, 17 and 18, respectively, and the archwire 10 when received in the archwire slot 15 cooperates with the passive self-ligation orthodontic bracket 11 so as to simultaneously impart forces to the passive self-ligation orthodontic bracket, and which affects first, second and third order movements 42, 43 and 44 respectively of a patient's tooth 40, and upon which the orthodontic bracket is attached. The resilient main body 100 of the archwire 10 has a circular-square or circular-rectangular cross-sectional shape which, when cooperating with the archwire slot 15 consistently maintains first order movement control 42 of the tooth 41 of the patient, while simultaneously permitting the passive self-ligation orthodontic bracket 11 to exert a selectable amount of torqueing force to the tooth 41 so as to achieve desired second and third order movements 43 and 44 of the tooth 41 based, at least in part, upon thickness dimension of the archwire 10 which is selected and positioned within the archwire slot 15.

More specifically, the archwire 10 for use with a passive self-ligation orthodontic bracket 11, and which has an archwire slot 15 includes an elongated and resilient main body 100 which is dimensioned so as to be received within the archwire slot 15 of the passive self-ligation bracket 11. The resilient main body 100 of the archwire 10 has a circular-square or circular-rectangular cross-sectional shape having a predetermined circumferential width dimension 103, and a variable thickness dimension 104. The resilient main body 100 further has a longitudinal axis 101, and wherein the circular-square or circular-rectangular shape main body 100 is further defined by spaced, substantially parallel, and planar superior and inferior facing surfaces 105 and 106, and which are individually oriented along parallel chords 105A and 106A, respectively, of the elongated circular-square or circular-rectangular shaped main body 100. The thickness dimension 104 of the resilient main body 100, is measured between the superior and inferior facing surfaces 105 and 106. Further the superior and inferior facing surfaces 105 and 106 are located at an equally spaced, radial distance from the longitudinal axis 101. The circumferential width dimension 103 of the resilient main body 100 of the archwire 10 maintains a consistent first order movement 42 of a tooth 40 of a patient when the archwire 10 is cooperating with a passive self-ligation bracket 11. The variable thickness dimension 104 of the archwire 10 facilitates an adjustable application of a force to the passive self-ligation orthodontic bracket 11 so as to achieve a clinician selectable and controllable second and third order movement 43 and 44 of the tooth 41 of the patient.

Therefore it will be seen that the archwire 10 of the present invention provides a convenient means by which a clinician may apply predetermined amounts of second and third degree movement to a patient's tooth in order to provide fine, finishing alignments for the teeth of a patient undergoing an orthodontic treatment regimen. Still further, the new archwire 10 provides a convenient means for addressing the problems associated with the prior art practices and which have been impeded by the inability of clinicians to close the moveable gates of passive self-ligation brackets especially when such brackets have been oriented so as to impart low torqueing couples, or high torqueing couples to the teeth 40 upon which the orthodontic brackets are attached. The present archwire is easy to employ, allows a clinician to use a single archwire style for the vast majority of their clinical applications; allows a clinician to use lighter force archwires, which provides greater comfort for the patients, and additionally allows clinicians to rotate and move a patient's teeth in a manner which can achieve superior results in shorter treatment times and with greatly improved clinical results.

A first aspect of the present invention is an archwire 10, 200 for use with a passive ligation orthodontic bracket system having a first orthodontic bracket 11, and a second orthodontic bracket 11, and wherein each of the first and second orthodontic brackets 11 have a bracket body 13 having an integral pad, which is located on a posterior side of the bracket body 13, and further having a posterior surface adapted to be releasably affixed to an anterior facing surface 41 of a patient's tooth 40, and wherein the bracket body 13 further has an anterior, outwardly facing surface 14 defining an opening to a three sided nonrectangular archwire slot/channel 15 defined in the bracket body 13, and wherein the three sided nonrectangular archwire slot/channel 15 is sized so as to receive the archwire 10, 200 therein, and the anterior outwardly facing portion 14 of the bracket body 13 is configured to slidably carry a movable gate 23, and wherein the movable gate 23 has an anterior facing surface 24 and an opposing posterior facing surface 25, and is further slidably movable between an open position relative to the opening of the three sided non-rectangular archwire slot/channel 15, and a closed position relative to the opening of the three sided non-rectangular archwire slot/channel 15, and wherein, when the moveable gate 23 is located in the closed position relative to the opening of the archwire slot/channel 15, the posterior facing surface 25 of the moveable gate 23 and the three sided nonrectangular archwire slot/channel 15 define a four sided archwire channel 15 having a cross-sectional, quadrilateral shape that is defined by four angles which are not right angles, and wherein the quadrilateral archwire channel 15 encloses and cooperates with the archwire 10, 200 to apply a predetermined force to the bracket body 13 so as to effect first, second, or third order movements to the patient's tooth 40, and wherein the archwire 10, 200 is movable axially within the quadrilateral archwire channel 15 and relative to the bracket body 13, and wherein the anterior facing surface 24 of the moveable gate 23 lies substantially along a plane defined by the anterior, outwardly facing surface 14 of the bracket body 13, and a rib on the anterior facing surface 24 of the moveable gate 23 maintains a precise angular orientation of the moveable gate 23 relative to the bracket body 13, and wherein the first orthodontic bracket 11 is releasably affixed to an anterior surface 41 of a first tooth 40 of the patient, and the first orthodontic bracket 11 has a first angular orientation of its respective quadrilateral archwire channel 15 relative to its respective bracket body 13 so as to direct a first predetermined force to the first tooth 40 and effect a resulting movement of the first tooth 40, and wherein the second orthodontic bracket 11 is releasably affixed to an anterior surface 41 of a second tooth 40 of the patient, and wherein the second orthodontic bracket 11 has a second angular orientation of its respective quadrilateral archwire channel 15 relative to its respective bracket body 13 so as to direct a second predetermined force to the second tooth 40, and effect a resulting movement of the second tooth 40, and wherein the first angular orientation is different than the second angular orientation, and wherein the first orthodontic bracket 11 and the second orthodontic bracket 11 align to a center level archwire slot line-up 180, the archwire 10, 200 having a first original configuration positioned in closely spaced relationship relative to, and along, a dental arch of a patient, and wherein the archwire 10, 200 has a substantially uniform, circular-square or circular-rectangular cross-sectional shape along its entire length, and wherein the substantially uniform cross-sectional shape has only two diametrically opposed radially convexly curved surfaces 107, 108, 205, 206, and only two opposed and parallel generally planar surfaces 105, 106, 203, 204, and the only two opposed and parallel generally planar surfaces 105, 106, 203, 204 extend between and communicate with the only two diametrically opposed radially convexly curved surfaces 107, 108, 205, 206; and the archwire 10, 200 is not intentionally distorted to assume a shape different from the original first configuration so as to impart the predetermined force to the first tooth 40 and to the second tooth 40.

A further aspect of the present invention is an archwire 10, 200 for use with a passive ligation orthodontic bracket system wherein a thickness dimension 104 of the archwire 10, 200 is greater than a chord length of the given radius of a rounded corner of the quadrilateral archwire channel 15.

A further aspect of the present invention is an archwire 10, 200 for use with a passive ligation orthodontic bracket system wherein the substantially uniform cross-sectional shape of the archwire 10, 200 has a superior facing surface 105, 203 and an inferior facing surface 106, 204, and the superior facing surface 105, 203 and the inferior facing surface 106, 204 are spaced apart, parallel, and extend between and connect the two diametrically opposed radially curved convex surfaces 107, 108, 205, 206.

A further aspect of the present invention is an archwire 10, 200 for use with a passive ligation orthodontic bracket 11 system wherein the archwire 10, 200 has a predetermined diameter 103 between the two diametrically opposed radially curved convex surfaces 107, 108, 205, 206, and wherein the predetermined diameter 103 is selected to maintain a consistent first order movement control of the first tooth 40 and the second tooth 40 when the archwire 10, 200 is within the quadrilateral archwire channel 15 and cooperating with the respective bracket bodies 13, and wherein a thickness dimension 104 of the archwire 10, 200 between two opposing, parallel, planar surfaces 105, 106, 203, 204 controls an application of force to the respective bracket bodies 13 to direct second or third order movements to the first and second teeth 40 of the patient.

A further aspect of the present invention is an archwire 10, 200 for use with a passive ligation orthodontic bracket 11 system wherein each of the two diametrically opposed radially curved convex surfaces 107, 108, 205, 206 of the archwire 10, 200 each simultaneously contact an interior surface 20, 21, 22, 23 of the quadrilateral four sided archwire channel 15 at only a single point of contact.

A further aspect of the present invention is an archwire 10, 200 for use with a passive ligation orthodontic bracket system wherein the two diametrically opposed radially curved convex surfaces 107, 108, 205, 206 of the archwire 10, 200 are arcs having a single shared center 101, 202.

A further aspect of the present invention is an archwire 10, 200 for use with a passive ligation orthodontic bracket system wherein the archwire 10, 200 has an elongated and resilient main body 201 which has a single, predetermined width dimension 103, and a single predetermined thickness dimension 104, and wherein the single predetermined width dimension 103 of the resilient main body 201 maintains a consistent first order movement control of the patient's tooth 40 when the resilient main body 201 of the archwire 10, 200 is received, and enclosed within the quadrilateral archwire channel 15 throughout the entire orthodontic treatment regimen, and wherein the single predetermined, and uniform thickness dimension 104 of the archwire 10, 200 facilitates an application of the given torqueing couple to the passive ligation orthodontic bracket body 13 so as to achieve a clinician selectable, and controllable, second and third order movement of the patient's tooth 40 without any intentional distortion, bending, twisting or deformation of the archwire 10, 200 by the clinician during the selected orthodontic treatment regimen, and wherein the quadrilateral archwire channel 15, which encloses the archwire 10, 200, maintains the orientation of the enclosed archwire 10, 200 in the central region 16 of the quadrilateral archwire channel 15, so as to achieve the clinician selected first, second and third order movement of the patient's tooth 40, and wherein the archwire 10, 200 has a predetermined and constant width dimension 103 which is less than a width dimension of the quadrilateral archwire 15, and a predetermined and constant thickness dimension 104 which is at least 55 percent of the height dimension 18 of the quadrilateral archwire channel 15.

A further aspect of the present invention is an archwire 10, 200 for use with a passive ligation orthodontic bracket system comprising a second archwire 10, 200 having a second configuration positioned in closely spaced relationship to, and along the dental arch of a patient, and wherein the second archwire 10, 200 has a substantially uniform, circular square or circular rectangular cross-sectional shape along its entire length, and wherein the substantially uniform cross-sectional shape has only two diametrically opposed radially curved convex surfaces 107, 108, 205, 206, and further has a superior facing surface 105, 203 and an opposing inferior facing surface 104, 204, and the superior facing surface 105, 203 and the opposing inferior facing surface 104, 204 are spaced apart and parallel, and extend between and connecting the two diametrically opposed and radially curved convex surfaces 107, 108, 205, 206, and wherein a dimension 104 between the superior facing surface 105, 203 and the opposing inferior facing surface 104, 204 of the second archwire 10, 200 is different from that of the first archwire 10, 200.

A further aspect of the present invention is an archwire 10, 200 comprising an elongated body 201 configured to be placed in close adjacent proximity to a patient's dental arch, the body 201 having a center 101, 202 at a longitudinal axis 202 and a cross-sectional configuration having only two opposing and diametrically spaced apart radially convexly curved surfaces 107, 108, 205, 206 and only two opposing and diametrically spaced apart planar surfaces 105, 106, 203, 204; and a single consistent diameter dimension 103 of the body 201 measured along any line extending from one radially convexly curved surface 107, 108, 205, 206 to the diametrically opposed radially convexly curved surface 107, 108, 205, 206 and passing through the center 101, 202; and a single consistent thickness dimension 104 of the body 201 measured along any line extending from one planar surface 105, 106, 203, 204 to the diametrically opposed planar surface 105, 106, 203, 204 and perpendicular to the two diametrically opposed apart planar surfaces 105, 106, 203, 204.

In compliance with the statute, the invention has been described in language more or less specific as to structural and methodical features. It is to be understood, however, that the invention is not limited to specific features shown and described since the means herein disclosed comprise preferred forms of putting the invention into effect. The invention is therefore, claimed in any of its forms or modifications within the proper scope of the appended claims appropriately interpreted in accordance with the Doctrine of Equivalence.

We claim:

1. An archwire for use with a passive ligation orthodontic bracket system with a first self-ligating orthodontic bracket having a first bracket body that defines a first archwire slot including a first anterior surface and a first gate that is moveable relative to the first bracket body between an opened position and a closed position, in which the first anterior surface and the first gate define a first slot width, the archwire comprising:
  an elongated body having a first end, a second end extending therefrom, and a cross-sectional configuration having only two opposing curved surfaces and only two opposing planar surfaces, the two opposing curved surfaces defining a diameter dimension of the body and the two opposing planar surfaces defining a thickness dimension of the body,
  wherein each of the diameter dimension and the thickness dimension is uniform from the first end to the second end with the diameter dimension being less than or equal to the first slot width.

2. The archwire of claim 1 wherein when the archwire is in the first archwire slot, the first gate is moveable to the closed position and the first self-ligating orthodontic bracket is moveable relative to the archwire.

3. The archwire of claim 1 wherein the diameter dimension is equal to the first slot width.

4. The archwire of claim 1 wherein the first archwire slot includes a first inferior surface spaced apart from a first superior surface to define a first slot height, each of the first inferior surface and the first superior surface extending from the first anterior surface, and
  wherein the thickness dimension is at least 55 percent of the first slot height.

5. The archwire of claim 1 wherein the two opposing curved surfaces are arcs defined by a circle.

6. The archwire of claim 1 wherein the passive self-ligating orthodontic bracket system includes a second self-ligating orthodontic bracket having a second bracket body that defines a second archwire slot including a second anterior surface and a second gate that is moveable relative to the second bracket body between an opened position and a closed position, in which the second anterior surface and the second gate define a second slot width, the second self-ligating orthodontic bracket having a different built-in torque than the first self-ligating orthodontic bracket, and
  wherein the diameter dimension of the archwire is equal to or less than the second slot width, and the archwire is configured to provide the same degree of first order movement control with the second self-ligating orthodontic bracket as with the first self-ligating orthodontic bracket.

7. The archwire of claim 6 wherein when the archwire is in the second archwire slot, the second gate is moveable to the closed position and the second self-ligating orthodontic bracket is moveable relative to the archwire.

8. The archwire of claim 6 wherein the diameter dimension is equal to the first slot width and the second slot width.

9. The archwire of claim 6 wherein the second archwire slot includes a second inferior surface spaced apart from a second superior surface to define a second slot height, each of the second inferior surface and the second superior surface extending from the second anterior surface, and
  wherein the thickness dimension is at least 55 percent of the second slot height.

10. An archwire for use with a first self-ligating orthodontic bracket having a first bracket body that defines a first archwire slot including an anterior surface and an inferior surface spaced apart from a superior surface to define a first slot height, each of the inferior surface and the superior surface extending in the same direction from the anterior surface, and a first gate that is moveable relative to the first bracket body between an opened position and a closed position in which the anterior surface and the first gate define a first slot width, the archwire comprising:
  an elongated body having a first end, a second end extending therefrom, and a cross-sectional configuration having two opposing curved surfaces and two opposing planar surfaces, the two opposing curved surfaces define a largest cross-sectional dimension of the body and the two opposing planar surfaces define a thickness dimension of the body,
  wherein the largest cross-sectional dimension and the thickness dimension are uniform from the first end to the second end and the largest cross-sectional dimension is substantially equal to the first slot width.

11. The archwire of claim 10 wherein when the archwire is in the first archwire slot, the first gate is moveable to the closed position and the first self-ligating orthodontic bracket is moveable relative to the archwire.

12. The archwire of claim 10 wherein the thickness dimension is at least 55 percent of the first slot height.

13. The archwire of claim 10 wherein the elongated body has a center along a longitudinal axis extending from the first end to the second end and each of the two opposing curved surfaces intersects the two opposing planar surfaces and is defined by a radial dimension from the center, the largest cross-sectional dimension being equal to twice the radial dimension.

14. The archwire of claim 10 wherein the cross-sectional configuration has a width dimension that is measured perpendicular to the thickness dimension and is equal to the largest cross-sectional dimension.

15. The archwire of claim 10 for use with a second self-ligating orthodontic bracket having a second bracket body that defines a second archwire slot including an anterior surface and a second gate that is moveable relative to the second bracket body between an opened position and a closed position, in which the anterior surface and second gate define a second slot width, the second self-ligating orthodontic bracket having a different built-in torque than the first self-ligating orthodontic bracket, and
  wherein the largest cross-sectional dimension is substantially equal to the second slot width, and the archwire is configured to provide the same degree of first order movement control with the second self-ligating orthodontic bracket as with the first self-ligating orthodontic bracket.

16. The archwire of claim 15 wherein when the archwire is in the second archwire slot, the second gate is moveable to the closed position and the second self-ligating orthodontic bracket is moveable relative to the archwire.

17. The archwire of claim 15 wherein the two opposing curved surfaces are arcs defined by a circle.

18. In combination:
  a first self-ligating orthodontic bracket comprising:
    a first bracket body that includes a first archwire slot being configured to receive an archwire and having an anterior surface and an inferior surface spaced apart from a superior surface to define a first slot height, each of the inferior surface and the superior surface extending in the same direction from the anterior surface; and
    a first gate that is moveable relative to the first bracket body between an opened position and a closed position in which the anterior surface and the first gate define a first slot width;
  an archwire for insertion into the first archwire slot, the archwire comprising:

an elongated body having a first end, a second end extending therefrom, and a cross-sectional configuration having two opposing curved surfaces and two opposing planar surfaces, the two opposing curved surfaces define a largest cross-sectional dimension of the body and the two opposing planar surfaces define a thickness dimension of the body, wherein the largest cross-sectional dimension and the thickness dimension are uniform from the first end to the second end and the largest cross-sectional dimension is substantially equal to the first slot width; and a second self-ligating orthodontic bracket comprising:
a second bracket body that includes a second archwire slot being configured to receive the archwire and having an anterior surface and an inferior surface spaced apart from a superior surface to define a second slot height, each of the inferior surface and the superior surface extending in the same direction from the anterior surface; and
a second gate that is moveable relative to the second bracket body between an opened position and a closed position in which the anterior surface and the second gate define a second slot width, wherein the first self-ligating orthodontic bracket is configured to provide a first torque couple, and the second self-ligating orthodontic bracket is configured to provide a different torque couple than the first self-ligating orthodontic bracket; and wherein the largest cross-sectional dimension is substantially equal to the second slot width, and when the archwire is in each of the first archwire slot and the second archwire slot, each of the first gate and the second gate is moveable to the closed position, and the archwire is configured to provide the same degree of first order movement control to each of the first self-ligating orthodontic bracket and the second self-ligating orthodontic bracket.

19. The combination of claim 18 wherein when the archwire is in the first archwire slot, the first gate is moveable to the closed position and the first self-ligating orthodontic bracket is moveable relative to the archwire.

20. The combination of claim 18 wherein the thickness dimension is at least 55 percent of the first slot height.

21. The combination of claim 18 wherein the elongated body has a center along a longitudinal axis extending from the first end to the second end and each of the two opposing curved surfaces intersects the two opposing planar surfaces and is defined by a radial dimension from the center, the largest cross-sectional dimension being equal to twice the radial dimension.

22. The combination of claim 18 wherein the cross-sectional configuration has a width dimension that is measured perpendicular to the thickness dimension and is equal to the largest cross-sectional dimension.

23. The combination of claim 18 wherein the first self-ligating orthodontic bracket and the second self-ligating orthodontic bracket are each moveable relative to the archwire.

24. A method of orthodontic treatment of a patient using passive self-ligating brackets comprising:
attaching a first self-ligating orthodontic bracket comprising:
a first bracket body that includes a first archwire slot being configured to receive an archwire and having an anterior surface and an inferior surface spaced apart from a superior surface to define a first slot height, each of the inferior surface and the superior surface extending in the same direction from the anterior surface; and
a first gate that is moveable relative to the first bracket body between an opened position and a closed position in which the anterior surface and the first gate define a first slot width to one of the patient's teeth; and
attaching a second self-ligating orthodontic bracket comprising:
a second bracket body that includes a second archwire slot being configured to receive the archwire and having an anterior surface and an inferior surface spaced apart from a superior surface to define a second slot height, each of the inferior surface and the superior surface extending in the same direction from the anterior surface; and
a second gate that is moveable relative to the second bracket body between an opened position and a closed position in which the anterior surface and the second gate define a second slot width,
wherein the first self-ligating orthodontic bracket is configured to provide a first torque couple, and the second self-ligating orthodontic bracket is configured to provide a different torque couple than the first self-ligating orthodontic bracket to another one of the patient's teeth;
inserting an archwire into the first archwire slot, the archwire comprising:
an elongated body having a first end, a second end extending therefrom, and a cross-sectional configuration having two opposing curved surfaces and two opposing planar surfaces, the two opposing curved surfaces define a largest cross-sectional dimension of the body and the two opposing planar surfaces define a thickness dimension of the body,
wherein the largest cross-sectional dimension and the thickness dimension are uniform from the first end to the second end and the largest cross-sectional dimension is substantially equal to the first slot width and the largest cross-sectional dimension is substantially equal to the second slot width;
moving the first gate to the closed position to form a first closed lumen in which the archwire is retained in the first self-ligating orthodontic bracket, the archwire limiting a first rotation angle of the first self-ligating orthodontic bracket about an axis generally perpendicular to the plane of the archwire;
inserting the archwire into the second archwire slot; and
moving the second gate to a closed position to form a second closed lumen in which the archwire is retained in the second self-ligating orthodontic bracket, the archwire limiting a second rotation angle of the second self-ligating orthodontic bracket about an axis generally perpendicular to the plane of the archwire,
wherein the first rotation angle is the same as the second rotation angle, the archwire providing the same degree of first order movement control to each of the first self-ligating orthodontic bracket and the second self-ligating orthodontic bracket.

25. The method of claim 24 wherein attaching the first self-ligating orthodontic bracket and attached the second self-ligating orthodontic bracket includes:
attaching the first self-ligating orthodontic bracket and the second self-ligating orthodontic bracket along a level line that passes through a center of each of the first archwire slot and the second archwire slot.

26. The method of claim 24 wherein inserting the archwire includes inserting the archwire into each of the first archwire slot and the second archwire slot without bending the archwire.

\* \* \* \* \*